(12) United States Patent
Krogman et al.

(10) Patent No.: US 10,613,261 B2
(45) Date of Patent: Apr. 7, 2020

(54) SELECTIVE LIGHT-BLOCKING OPTICAL PRODUCTS HAVING A NEUTRAL REFLECTION

(71) Applicant: SOUTHWALL TECHNOLOGIES INC., Palo Alto, CA (US)

(72) Inventors: Kevin C. Krogman, Santa Clara, CA (US); James Yancy Farrow, Lake St. Louis, MO (US); Daniel Lewis Hodder, St. Louis, MO (US); David Lee Honeycutt, Mesa, AZ (US); Lee Campbell Boman, Belmont, CA (US); Anthony Brian Port, Redwood City, CA (US); Bruce Robert Lang, Half Moon Bay, CA (US); Michael Hawkins, Martinsville, VA (US)

(73) Assignee: Southwall Technologies Inc., Palo Alto, CA (US)

( * ) Notice: Subject to any disclaimer, the term of this patent is extended or adjusted under 35 U.S.C. 154(b) by 25 days.

(21) Appl. No.: 15/947,891

(22) Filed: Apr. 9, 2018

(65) Prior Publication Data

US 2019/0310402 A1 Oct. 10, 2019

(51) Int. Cl.
*G02B 3/00* (2006.01)
*G02B 5/26* (2006.01)
(Continued)

(52) U.S. Cl.
CPC .......... *G02B 5/26* (2013.01); *B32B 17/10036* (2013.01); *B32B 17/10339* (2013.01);
(Continued)

(58) Field of Classification Search
CPC ....................................................... G02B 5/26
(Continued)

(56) References Cited

U.S. PATENT DOCUMENTS

| 2,282,026 A | 5/1942 | Bren et al. |
| 2,282,057 A | 5/1942 | Hopkins et al. |

(Continued)

FOREIGN PATENT DOCUMENTS

| CN | 1765827 A | 5/2006 |
| CN | 101355866 A | 1/2009 |

(Continued)

OTHER PUBLICATIONS

USPTO Notice of Allowance dated Apr. 3, 2019 in co-pending U.S. Appl. No. 15/689,493.
(Continued)

*Primary Examiner* — James C. Jones
(74) *Attorney, Agent, or Firm* — Michael K. Carrier

(57) ABSTRACT

Optical products that comprise a composite coating having multiple bilayers of a first layer and a second layer, each provided with a binding group component which together form a complementary binding group pair, the multiple bilayers comprising: at least one bilayer a) comprised of a first pigment or pigment blend that exhibits a color reflection value that is less than about 2.5; at least one bilayer b) comprised of a pigment or pigment blend that selectively blocks visible light in a wavelength range of interest; and at least one bilayer c) comprised of a second pigment or pigment blend that exhibits a color reflection value that is less than about 2.5, wherein the optical product selectively blocks visible light in the wavelength range of interest, while exhibiting a color reflection value that is less than about 2.5.

20 Claims, 9 Drawing Sheets

(51) Int. Cl.
  *G02B 5/22* (2006.01)
  *G02B 5/28* (2006.01)
  *C09D 7/41* (2018.01)
  *G02B 5/20* (2006.01)
  *C09D 5/32* (2006.01)
  *B32B 17/10* (2006.01)
  *C03C 27/06* (2006.01)
  *G02B 1/10* (2015.01)
  *C08K 5/00* (2006.01)

(52) U.S. Cl.
  CPC ............... *C03C 27/06* (2013.01); *C09D 5/32* (2013.01); *C09D 7/41* (2018.01); *G02B 1/10* (2013.01); *G02B 5/206* (2013.01); *G02B 5/223* (2013.01); *G02B 5/28* (2013.01); *C08K 5/0041* (2013.01); *C08K 2201/014* (2013.01)

(58) Field of Classification Search
  USPC ........................................................ 359/723
  See application file for complete search history.

(56) References Cited

U.S. PATENT DOCUMENTS

| | | |
|---|---|---|
| 3,978,264 A | 8/1976 | Tarbell et al. |
| 4,337,990 A | 7/1982 | Fan et al. |
| 4,410,501 A | 10/1983 | Taramasso et al. |
| 4,952,457 A | 8/1990 | Cartier et al. |
| 4,973,511 A | 11/1990 | Farmer et al. |
| 5,019,197 A | 5/1991 | Henderson |
| 5,071,206 A | 12/1991 | Hood et al. |
| 5,091,258 A | 2/1992 | Moran |
| 5,264,058 A | 11/1993 | Hoagland et al. |
| 5,609,943 A | 3/1997 | DeKoven et al. |
| 5,818,564 A | 10/1998 | Gray et al. |
| 5,925,228 A | 7/1999 | Panitz et al. |
| 5,956,175 A | 9/1999 | Hojnowski |
| 6,030,671 A | 2/2000 | Yang et al. |
| 6,055,088 A | 4/2000 | Fix et al. |
| 6,221,112 B1 | 4/2001 | Snider |
| 6,489,028 B1 | 12/2002 | Degand et al. |
| 6,627,175 B2 | 9/2003 | Schoebrechts |
| 6,881,444 B2 | 4/2005 | Hong et al. |
| 6,929,864 B2 | 8/2005 | Fleming et al. |
| 7,311,943 B2 | 12/2007 | Jacobson et al. |
| 7,659,002 B2 | 2/2010 | Coster et al. |
| 7,892,647 B2 | 2/2011 | Fisher et al. |
| 7,951,473 B2 | 5/2011 | Maschwitz |
| 8,234,998 B2 | 8/2012 | Krogman et al. |
| 8,277,899 B2 | 10/2012 | Krogman et al. |
| 8,689,726 B2 | 4/2014 | Krogman et al. |
| 8,882,267 B2 | 11/2014 | Ishak et al. |
| 9,387,505 B2 | 7/2016 | Krogman et al. |
| 9,817,166 B2 | 11/2017 | Boman et al. |
| 9,891,357 B2 | 2/2018 | Boman et al. |
| 2001/0046564 A1 | 11/2001 | Kotov |
| 2001/0048975 A1 | 12/2001 | Winterton et al. |
| 2002/0055552 A1 | 5/2002 | Schliesman et al. |
| 2003/0167878 A1 | 9/2003 | Al-Salim et al. |
| 2003/0224182 A1 | 12/2003 | Simpson et al. |
| 2004/0047979 A1 | 3/2004 | Qui et al. |
| 2004/0224095 A1 | 11/2004 | Miller |
| 2004/0229049 A1 | 11/2004 | Biore |
| 2005/0019550 A1 | 1/2005 | McGurran et al. |
| 2005/0025976 A1 | 2/2005 | Faris |
| 2005/0208319 A1 | 9/2005 | Finley et al. |
| 2006/0029634 A1 | 2/2006 | Berg et al. |
| 2006/0234032 A1 | 10/2006 | Morrison et al. |
| 2006/0257760 A1 | 11/2006 | Mod et al. |
| 2007/0032869 A1 | 2/2007 | Gilliard et al. |
| 2007/0053088 A1 | 3/2007 | Kranz |
| 2007/0054194 A1 | 3/2007 | Zhang et al. |
| 2007/0104922 A1 | 5/2007 | Zhai et al. |
| 2008/0060302 A1 | 3/2008 | Bletsos et al. |
| 2008/0233371 A1 | 9/2008 | Hayes et al. |
| 2008/0299036 A1 | 12/2008 | Vitner et al. |
| 2009/0015908 A1 | 1/2009 | Ando et al. |
| 2009/0029077 A1 | 1/2009 | Atanasoska et al. |
| 2009/0148707 A1 | 6/2009 | Anderson et al. |
| 2009/0153953 A1 | 6/2009 | Banerjee et al. |
| 2009/0155545 A1 | 6/2009 | Purdy et al. |
| 2009/0161220 A1 | 6/2009 | Banerjee et al. |
| 2009/0162592 A1 | 6/2009 | Baikerikar et al. |
| 2009/0209665 A1 | 8/2009 | Fu et al. |
| 2009/0324910 A1 | 12/2009 | Gemici et al. |
| 2010/0003499 A1 | 1/2010 | Krogman et al. |
| 2010/0047620 A1 | 2/2010 | Decker et al. |
| 2010/0092377 A1 | 4/2010 | Scott et al. |
| 2010/0098902 A1 | 4/2010 | Kotov et al. |
| 2010/0189913 A1 | 7/2010 | Kotov et al. |
| 2010/0190001 A1 | 7/2010 | Barton et al. |
| 2010/0208349 A1 | 8/2010 | Beer et al. |
| 2010/0209593 A1 | 8/2010 | Banerjee et al. |
| 2010/0291364 A1 | 11/2010 | Kourtakis et al. |
| 2010/0304150 A1 | 12/2010 | Zheng et al. |
| 2010/0315693 A1 | 12/2010 | Lam et al. |
| 2011/0014366 A1 | 1/2011 | Nogueira et al. |
| 2011/0075096 A1 | 3/2011 | Ishak et al. |
| 2011/0089018 A1 | 4/2011 | Chang et al. |
| 2011/0135888 A1 | 6/2011 | Xu et al. |
| 2011/0195239 A1 | 8/2011 | Takane |
| 2011/0274767 A1 | 11/2011 | Kato et al. |
| 2012/0028005 A1 | 2/2012 | Zheng et al. |
| 2012/0052317 A1 | 3/2012 | Shi et al. |
| 2012/0082831 A1 | 4/2012 | Wang et al. |
| 2012/0194819 A1 | 8/2012 | Varma |
| 2013/0003206 A1 | 1/2013 | Kabagambe et al. |
| 2013/0108832 A1 | 5/2013 | Domercq et al. |
| 2013/0183516 A1 | 7/2013 | Krogman et al. |
| 2013/0273242 A1 | 10/2013 | Krogman et al. |
| 2013/0278989 A1 | 10/2013 | Lam et al. |
| 2014/0079884 A1 | 3/2014 | Krogman et al. |
| 2014/0079922 A1 | 3/2014 | Wang et al. |
| 2014/0218792 A1 | 8/2014 | Krogman et al. |
| 2014/0220351 A1 | 8/2014 | Krogman et al. |
| 2014/0242321 A1 | 8/2014 | Schmid et al. |
| 2014/0242393 A1 | 8/2014 | Olmeijer et al. |
| 2015/0033988 A1* | 2/2015 | Wu .................. G02B 5/26 106/417 |
| 2015/0285956 A1 | 10/2015 | Schmidt et al. |
| 2016/0082697 A1 | 3/2016 | Hara et al. |
| 2016/0137802 A1 | 5/2016 | Lee et al. |
| 2016/0168035 A1 | 6/2016 | Matus et al. |
| 2016/0170104 A1 | 6/2016 | Nand et al. |
| 2016/0230017 A1 | 8/2016 | Woolf |
| 2017/0075045 A1 | 3/2017 | Medwick et al. |

FOREIGN PATENT DOCUMENTS

| | | |
|---|---|---|
| CN | 102020899 A | 4/2011 |
| CN | 102645692 B | 11/2014 |
| EP | 1 201 616 A2 | 5/2002 |
| EP | 1 046 068 B1 | 5/2003 |
| EP | 1 334 380 A1 | 8/2003 |
| EP | 2 130 844 A1 | 12/2009 |
| EP | 2226364 A1 | 9/2010 |
| EP | 2 343 579 A1 | 7/2011 |
| GB | 1 511 652 A | 5/1978 |
| GB | 2 198 739 A | 6/1988 |
| JP | H 04 197427 A | 7/1992 |
| JP | 11 292537 A | 10/1999 |
| JP | 2005-239999 A | 9/2005 |
| JP | 2006-301125 A | 11/2006 |
| JP | 2008 041377 A | 2/2008 |
| JP | 2008-188513 A | 8/2008 |
| JP | 2010 132514 A | 6/2010 |
| JP | S57117749 A | 6/2010 |
| KR | 10-2004-0086912 A | 10/2004 |
| KR | 10-2005-0059582 A | 6/2005 |
| KR | 10-2011-0082625 A | 7/2011 |
| KR | 10-2011-0083729 A | 7/2011 |
| TW | 201020115 A | 6/2010 |
| TW | 201421640 A | 6/2014 |
| WO | WO 00/10934 A1 | 3/2000 |

(56) References Cited

FOREIGN PATENT DOCUMENTS

| WO | WO 2005/072947 A1 | 8/2005 |
|---|---|---|
| WO | WO 2006/100060 A2 | 9/2006 |
| WO | WO 2010/044402 A1 | 4/2010 |
| WO | WO 2011/144754 A2 | 11/2011 |
| WO | WO 2012/075309 A1 | 6/2012 |
| WO | WO 2014/099367 A1 | 6/2014 |
| WO | WO 2014/150903 A1 | 9/2014 |
| WO | WO 2014/172139 A2 | 10/2014 |
| WO | WO 2014/172332 A1 | 10/2014 |
| WO | WO 2014/193550 A1 | 12/2014 |
| WO | WO 2015/095317 A1 | 6/2015 |
| WO | WO 2017/077359 A1 | 5/2017 |
| WO | WO 2017/095468 A1 | 6/2017 |
| WO | WO 2017/095469 A1 | 6/2017 |

OTHER PUBLICATIONS

Taiwan Office Action and Search Report, ROC (Taiwan) Patent Application No. 104137947, Date of Completion of Search Mar. 21, 2019. (Original language Office Action and English Translation of Search Report).
Co-pending U.S. Appl. No. 14/569,955, filed Dec. 15, 2014, Nand et al.
ASTM G173-03; Standard Tables for Reference Solar Spectral Irradiances: Direct Normal and Hemispherical on 37° Tilted Surface.
ASTM D1003-07; Standard Test Method for Haze and Luminous Transmittance of Transparent Plastics.
ASTM D1787-89; Standard Test Method for Pentosans in Cellulose.
ASTM D3359-09$^{e2}$; Standard Test Methods for Measuring Adhesion by Tape Test.
ASTM D4329-13; Standard Practice for Fluorescent Ultraviolet (UV) Lamp Apparatus Exposure of Plastics.
ASTM D4587-11; Standard Practice for Fluorescent UV-Condensation Exposures of Paint and Related Coatings.
Hennink et al.; "Novel crosslinking methods to design hydrogels"; Advanced Drug Delivery Reviews; vol. 54 (2002); pp. 13-36.
Krogman, et al.; "Automated Process for Improved Uniformity and Versatility of Layer-by-Layer Deposition"; Langmuir 2007, 23, pp. 3137-3141.
Lee et al.; "Formation of Nanoparticle-Loaded Microcapsules Based on Hydrogen-Bonded Multilayers"; Chem. Mater.; 2005, vol. 17; pp. 1099-1105.
Nolte, Adam John; "Fundamental Studies of Polyelectrolyte Multilayer Films: Optical, Mechanical, and Lithographic Property Control"; Thesis (PhD); Massachusetts Institute of Technology; Dept. of Materials Science and Engineering; Feb. 2007 (Abstract, pp. 32-29, Figure 2.3).
Rouse, et al.; "Sol-Gel Processing of Ordered Multilayers to Produce Composite Films of Controlled Thickness"; Chem. Mater.; 2000; 12; pp. 2502-2507.
Kim, et al.; "Synthesis and Structures of New Layered Ternary Manganese Tellurides: AMnTe$_2$ (A=K, Rb, Cs) Na$_3$Mn$_4$Te$_6$, and NaMn$_{1.56}$Te$_2$"; Inorg. Chem.; 1999; 38; pp. 235-242.
Kim, et al.; "Hydrothermal synthesis of titanium dioxides using basic peptizing agents and their photocatalytic activity"; Chemical Engineering Science; 62 (2007); pp. 5154-5159.
PCT International Search Report for International Application No. PCT/US2011/064397 dated Jun. 6, 2012.
PCT International Search Report for International Application No. PCT/US2012/025138 dated Oct. 30, 2012.
PCT International Search Report for International Application No. PCT/US2012/059147 dated Mar. 28, 2013.
PCT International Search Report for International Application No. PCT/US2012/062892 dated Mar. 29, 2013.
PCT International Search Report for International Application No. PCT/US2012/059142 dated Apr. 29, 2013.
PCT International Search Report for International Application No. PCT/US2013/059337 dated Dec. 6, 2013.
USPTO Office Action dated May 21, 2014 in co-pending U.S. Appl. No. 14/024,649.
USPTO Office Action dated Jul. 23, 2014 in co-pending U.S. Appl. No. 13/633,809.
USPTO Office Action dated Sep. 25, 2014 in co-pending U.S. Appl. No. 14/024,649.
USPTO Office Action dated Feb. 11, 2015 in co-pending U.S. Appl. No. 13/633,809.
USPTO Office Action dated Jun. 5, 2015 in co-pending U.S. Appl. No. 13/861,368.
USPTO Office Action dated Jul. 8, 2015 in co-pending U.S. Appl. No. 14/246,084.
Cammarata, et al.; "Carbodiimide Induced Cross-Linking, Ligand Addition, and Degradation in Gelatin"; Molecular Pharmaceutics; 2015; 12; pp. 783-793.
USPTO Office Action dated Sep. 8, 2015 in co-pending U.S. Appl. No. 13/633,809.
USPTO Office Action dated Sep. 11, 2015 in co-pending U.S. Appl. No. 14/024,649.
USPTO Office Action dated Oct. 30, 2015 in co-pending U.S. Appl. No. 14/028,450.
Wu et al.; "Deformable Antireflection Coatings from Polymer and Nanoparticle Multilayers"; Advanced Materials, 2006, 18, pp. 2699-2702.
USPTO Office Action dated Nov. 5, 2015 in co-pending U.S. Appl. No. 13/967,770.
USPTO Office Action dated Dec. 4, 2015 in co-pending U.S. Appl. No. 13/861,368.
USPTO Office Action dated Dec. 17, 2015 in co-pending U.S. Appl. No. 14/246,096.
USPTO Notice of Allowance dated Jan. 20, 2016 in co-pending U.S. Appl. No. 14/569,955.
USPTO Notice of Allowance dated Feb. 11, 2016 in co-pending U.S. Appl. No. 14/569,955.
USPTO Office Action dated Feb. 16, 2016 in co-pending U.S. Appl. No. 13/633,809.
USPTO Office Action dated Feb. 19, 2016 in co-pending U.S. Appl. No. 14/246,084.
USPTO Office Action dated Mar. 18, 2016 in co-pending U.S. Appl. No. 14/267,944.
PCT International Search Report for International Application No. PCT/US2015/063082 dated Mar. 24, 2016.
Co-pending U.S. Appl. No. 15/134,864, filed Apr. 21, 2016, Boman et al.
Co-pending U.S. Appl. No. 15/134,875, filed Apr. 21, 2016, Boman et al.
USPTO Notice of Allowance dated Apr. 26, 2016 in co-pending U.S. Appl. No. 14/246,096.
USPTO Office Action dated May 18, 2016 in co-pending U.S. Appl. No. 14/028,450.
USPTO Office Action dated May 19, 2016 in co-pending U.S. Appl. No. 13/861,368.
USPTO Notice of Allowance dated May 20, 2016 in co-pending U.S. Appl. No. 14/024,649.
USPTO Notice of Allowance dated May 20, 2016 in co-pending U.S. Appl. No. 14/246,096.
USPTO Notice of Allowance dated May 24, 2016 in co-pending U.S. Appl. No. 13/967,770.
USPTO Office Action dated Jun. 16, 2016 in co-pending U.S. Appl. No. 13/633,809.
PCT International Search Report for International Application No. PCT/US2016/028757 dated Sep. 1, 2016.
USPTO Office Action dated Sep. 6, 2016 in co-pending U.S. Appl. No. 13/861,368.
Co-pending U.S. Appl. No. 15/274,348, filed Sep. 23, 2016, Nand et al.
USPTO Office Action dated Sep. 26, 2016 in co-pending U.S. Appl. No. 14/267,944.
Supplementary European Search Report dated Nov. 4, 2016 for European Patent Application No. 13836268.6.
Hiller, Jeri'Ann et al, "Reversibty erasable nanoporous antireflection coatings from polyelectrolyte multilayers", Nature Materials, vol. 1, No. 1, Sep. 1, 2002, pp. 59-63, XP055016249.

(56) References Cited

OTHER PUBLICATIONS

PCT International Search Report for International Application No. PCT/US2016/028756 dated Nov. 29, 2016.
USPTO Notice of Allowance dated Jun. 29, 2017 in co-pending U.S. Appl. No. 15/274,348.
USPTO Notice of Allowance dated Jul. 6, 2017 in co-pending U.S. Appl. No. 15/134,864.
USPTO Notice of Allowance dated Jul. 6, 2017 in co-pending U.S. Appl. No. 15/134,875.
Co-pending U.S. Appl. No. 15/689,493, filed Aug. 29, 2017, Krogman et al.
USPTO Notice of Allowance dated Oct. 6, 2017 in co-pending U.S. Appl. No. 15/134,864.
USPTO Notice of Allowance dated Oct. 11, 2017 in co-pending U.S. Appl. No. 15/134,875.
USPTO Notice of Allowance dated Oct. 11, 2017 in co-pending U.S. Appl. No. 15/274,348.
Co-pending U.S. Appl. No. 15/947,903, filed Apr. 9, 2018, Krogman et al.
USPTO Office Action dated Nov. 20, 2018 in co-pending U.S. Appl. No. 15/689,493.
PCT International Search Report for International Application No. PCT/US2018/045933 dated Nov. 30, 2018.
Taiwan Office Action and Search Report, ROC (Taiwan) Patent Application No. 105112719, Date of Completion of Search Jun. 2, 2019. (Original language Office Action and English Translation of Search Report).
PCT International Search Report and Written Opinion for International Application No. PCT/US2019/025342 dated Jun. 25, 2019.
PCT International Search Report and Written Opinion for International Application No. PCT/US2019/025338 dated Jun. 25, 2019.
USPTO Office Action dated Jul. 25, 2019 in co-pending U.S. Appl. No. 15/947,903.
Taiwan Office Action and Search Report, ROC (Taiwan) Patent Application No. 105112717, Date of Completion of Search Jun. 2, 2019.

\* cited by examiner

Fig. 7—Transmission Data

Fig. 8—Reflection Data

US 10,613,261 B2

SELECTIVE LIGHT-BLOCKING OPTICAL PRODUCTS HAVING A NEUTRAL REFLECTION

FIELD OF THE INVENTION

The present invention broadly relates to optical products for use, for example, in automotive and architectural window applications. More particularly, the invention relates to optical products that provide selective light blocking while maintaining a desired neutral reflection.

BACKGROUND OF THE INVENTION

Light and energy blocking and color correction have typically been imparted to optical products such as solar control films by use of organic dyes. More particularly, current commercial practice for producing dyed film from polyester includes swelling of the molecular structure of the polyester in baths of hot organic solvent such as ethylene glycol during the dyeing process, as swelled polyester (particularly PET) films are capable of absorbing organic dyes. These films and their manufacturing processes suffer many drawbacks. For example, only a limited number of organic dyes are soluble and stable in the hot solvent swelling media used in the dyeing process and many of those are subject to degradation by high energy radiation (sub-400 nm wavelength) to which the substrate is subjected when used in window film applications, thereby shortening the useful lifetime of the product. Further, the dye typically permeates the entire thickness of the film such that there is no way to separate the filtration or blocking function of the film from its visible reflection, that is, from its external appearance.

To address some of these drawbacks, some film manufacturers have transitioned to using a pigmented layer on the surface of a base polymeric film for tinting a polymeric film. For example, U.S. Published Application number 2005/0019550A1 describes color-stable, pigmented optical bodies comprising a single or multiple layer core having at least one layer of an oriented thermoplastic polymer material having dispersed within it a particulate pigment. Such products can suffer a myriad of processing and performance drawbacks. For example, layers of this type are typically applied as thin films and require a relatively high pigment concentration to achieve a desired tint level, particularly in automotive window films with a relatively high desired level of darkening. These high pigment concentrations are difficult to uniformly disperse within the thin layer. And again, it may be difficult to separate the desired blocking properties of the product from its external appearance or reflection since the pigment is dispersed throughout the thickness of the thermoplastic polymer material.

More recently, layer-by-layer films have been developed to provide similar functionalities. Processes of making these films take advantage of charge-charge, hydrogen bonding, or other complementary interactions to assemble successive layers. This requires the use of solvents, typically water, to ionize molecules or support hydrogen donation and acceptance in the deposition solutions.

For example, U.S. Pat. Nos. 9,453,949 and 9,891,357, assigned to the assignee of the present application, the disclosures of which are incorporated herein by reference, disclose layer-by-layer composite films that include electromagnetic energy-absorbing insoluble particles that may be selected to provide pigmentation, UV-absorption, and/or IR-absorption properties. Likewise, U.S. Pat. No. 9,395,475, the disclosure of which is incorporated herein by reference, discloses layer-by-layer integrated stacks that serve as optical filters.

Optical products are known that can selectively block certain wavelengths of light, for example blue light that is believed to contribute to macular degeneration, cataracts, and the like. For example, shooting glasses having lenses containing yellow dyes are known to block blue light, but have a clearly discernible yellow tint to both the user and the observer. U.S. Pat. No. 8,882,267 discloses ophthalmic and nonophthalmic systems that are said to provide an average transmission of 80% or better transmission of visible light, to inhibit selective wavelengths of blue light, to allow for the wearer's proper color vision performance, and to provide a mostly color neutral appearance to an observer looking at the wearer wearing such a lens. The systems are said to be color balanced such that the yellow or amber color, or other unwanted effect of blue blocking is reduced, offset, neutralized or otherwise compensated for, so as to produce a cosmetically acceptable result, without at the same time reducing the effectiveness of the blue blocking.

A continuing need exists in the art for electromagnetic energy-absorbing optical products, and especially window films, that selectively filter bands of energy from transmitted visible light, producing a distinct transmitted color, while remaining relatively neutral in reflected color.

SUMMARY OF THE INVENTION

In one aspect, the invention relates to optical products that comprise a composite coating, deposited on a substrate, that includes multiple bilayers having a first layer and a second layer, each provided with a binding group component which together form a complementary binding group pair. According to this aspect, the multiple bilayers comprise, in sequence: at least one bilayer a) comprised of a first pigment or pigment blend that, when formed into a bilayer, exhibits a color reflection value that is less than about 2.5; at least one bilayer b) comprised of a pigment or pigment blend that, when formed into a bilayer, selectively blocks visible light in a wavelength range of interest; and at least one bilayer c) comprised of a second pigment or pigment blend that, when formed into a bilayer, exhibits a color reflection value that is less than about 2.5, and that may be the same as or different than the first pigment or pigment blend. In this aspect, the optical product selectively blocks visible light in the wavelength range of interest, while exhibiting a color reflection value that is less than about 2.5, as defined elsewhere herein.

In various aspects, the wavelength range of interest may be, for example, a 75 nm wavelength range, or a 50 nm wavelength range, or as described elsewhere. Similarly, in various aspects, the wavelength range of interest may be from 400 nm to 450 nm, or from 600 nm to 650 nm, or from 500 nm to 600 nm, or from 525 nm to 575 nm, or as described elsewhere herein.

In one aspect, the optical products of the invention may further comprise at least one bilayer d), deposited on the at least one bilayer c), comprised of a pigment or pigment blend that, when formed into a bilayer, selectively blocks visible light in the wavelength range of interest, and that may be the same as or different than the pigment or pigment blend of bilayer b); and at least one bilayer e) comprised of a neutral pigment or pigment blend that, when formed into a bilayer, exhibits a color reflection value that is less than about 2.5, and that may be the same as or different than the pigment or pigment blend of bilayer, a) or bilayer c).

In various aspects, the optical products of the invention may have a color reflection value of less than about 2.0, or less than about 1.5, or as described elsewhere herein.

In further aspects, the optical products of the invention may block at least 70% of visible light within the wavelength range of interest, or at least 80% of visible light within the wavelength range of interest, or as described elsewhere herein.

In one aspect, the substrate of the optical products of the invention may comprise a polyethylene terephthalate film, and separately, the composite coating may have a total thickness of from 5 nm to 1000 nm.

The optical products of the invention may be in the form of a window film that is applied to a vehicle, for example an automobile, an aircraft, or a boat. Similarly, the optical products of the invention may be in the form of a window film applied to a building, or may be a composite interlayer for laminated glass.

In other aspects, the optical products of the invention may have a visible light transmission of no less than 40%, or no less than 60%, or as described elsewhere herein.

Further aspects of the invention are as disclosed and claimed herein.

BRIEF DESCRIPTION OF THE DRAWINGS

The invention will be described in further detail below, and with reference to the accompanying drawings, wherein like reference numerals throughout the figures denote like elements and wherein.

DETAILED DESCRIPTION

Figure 1:
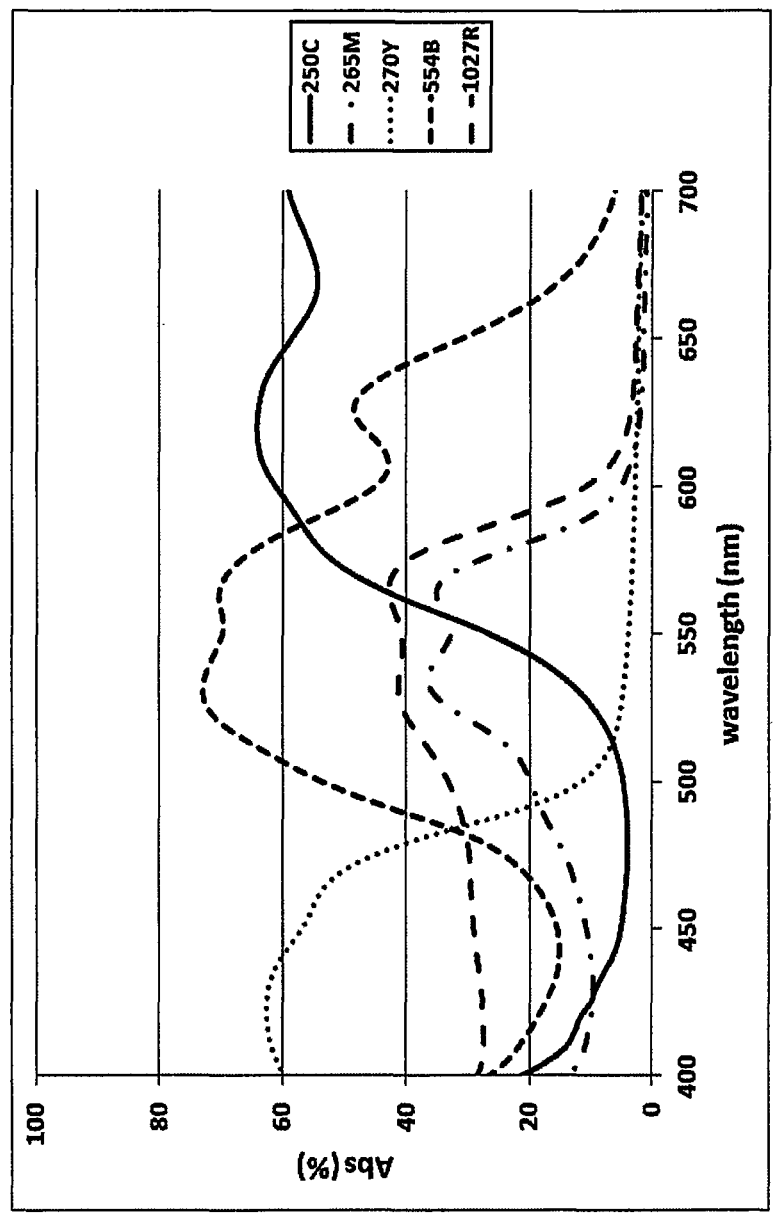
FIG. 1 is a plot of the percent of light absorbed over the visible wavelength range of thin films made from five pigments that are useful according to the invention.

According to the invention, optical products are provided that selectively block visible light in a wavelength range of interest, producing a distinct transmitted color, while remaining relatively neutral in reflected color. This is distinguished from light-filtering optical products in which residual color from a light-filtering functionality provided in the optical product results in a non-neutral reflection, that is, a reflection that is perceived by the eye as being colored.

In one aspect, then, the invention relates to pigmented optical products that selectively block visible light in a wavelength range of interest, for example a 50 nm wavelength range, while exhibiting a color reflection value, as defined herein, that is less than about 2.5.

In another aspect, the optical products of the invention block at least about 70% of visible light in a wavelength range of interest, while exhibiting a color reflection value, as defined herein, that is less than about 2.5.

According to the invention, optical products are provided that comprise composite coatings, deposited on a substrate, for example a polymeric substrate. These composite coatings comprise multiple bilayers that include a first layer and a second layer, each provided with a binding group component which together form a complementary binding group pair.

In one aspect, the multiple bilayers may comprise, in sequence: at least one bilayer a) comprised of a neutral pigment or pigment blend that, when mixed together and formed into a bilayer, exhibits a color reflection value that is less than about 2.5; at least one bilayer b) comprised of a pigment or pigment blend that, when mixed together and formed into a bilayer, selectively blocks visible light in a wavelength range of interest; and at least one bilayer c) comprised of a neutral pigment or pigment blend that, when formed into a bilayer, exhibits a color reflection value that is less than about 2.5, and that may be the same as or different than the bilayer a), wherein the optical product selectively blocks visible light in a wavelength range of interest, while exhibiting a color reflection value that is less than, for example, about 2.5.

When we say that the optical product or film, or an individual bilayer or plurality of bilayers, selectively blocks visible light within a wavelength range of interest, or within a defined wavelength range, or a predetermined wavelength range, we mean that the amount of light blocked within that wavelength range is greater than the amount of light blocked at other wavelength ranges of the same width within the visible light spectrum, which is defined herein for purposes of the invention as being from 400 nm to 700 nm. When we say that the light is selectively blocked, the definition of "blocked" is intended to encompass the light absorbed and the light reflected, as well as any light within the wavelength range that is scattered by the optical product; that is, all light that is not transmitted through the film or optical product so that it can be measured is considered to be "blocked," whether the light blocked is absorbed, reflected, or scattered. The wavelength of interest can, of course, be predetermined, and a pigment selected, for example, that absorbs light within that preselected or predetermined wavelength range. Conversely, the wavelength range of interest may be randomly selected, in the sense that pigments may be tried for novelty or esthetic effect and chosen based solely on appearance and their effect on transmitted color, so long as the desired relatively neutral reflection is also achieved, as defined by the color reflection value.

We note that generally-accepted definitions of the wavelength range of visible light, as well as the definitions of perceived colors and the wavelengths of light within which the colors are perceived, are somewhat approximate. Further, the range within the visible spectrum that light according to the invention is selectively blocked will be, in part, a function of the type of light-filtering functionality provided to the optical products of the invention, for example the nature of the pigment particle(s) themselves, as well as the part of the visible light spectrum that is intended to be blocked, since different "colors" are perceived over varying wavelength ranges of light. For example, light perceived as red may be broadly and somewhat arbitrarily defined as light having a wavelength range as broad as from about 620 nm to about 750 nm (that is, partly outside the visible spectrum although perceivable by some individuals), a wavelength range of about 130 nm. Further, certain definitions of blue color (and especially those in which violet is defined within a separate wavelength range) are defined as having a wavelength range as narrow as from about 450 nm to about 495 nm, while other definitions of blue-colored light extend from 400 nm to 500 nm. The wavelength ranges of interest that are selectively blocked according to the invention are thus a function of the part of the visible wavelength range that is blocked, as well as the fundamental properties of the pigment(s) used to selectively block the light, especially the absorptive properties, as well as any interference properties of the film that may be a function of the thickness of the individual first or second layers, or the two layers that together form a bilayer.

Thus, according to the invention, the wavelength ranges of visible light which the optical products of the invention selectively block may be, for example, as narrow as a 25 nm wavelength range, or may be a 30 nm wavelength range, or a 40 nm wavelength range, or a 50 nm wavelength range, or a 60 nm wavelength range, or a 75 nm wavelength range, or a 100 nm wavelength range. In a broad aspect, the defined wavelength range of interest is a range in which the amount of light selectively blocked is greater than the amount blocked in any other visible wavelength range of the same width, with the visible wavelength range of light as defined herein being from 400 nm to 700 nm. Thus, in one aspect, the amount of light within the wavelength range of interest that is selectively blocked may be defined with respect to other ranges of the same width, such that the amount of visible light blocked within the wavelength range of interest is greater than the amount of visible light blocked within any other range of the same width in the visible light spectrum.

Further, the amount of light selectively blocked within the wavelength range of interest may also be defined in absolute terms. That is, the amount of light blocked within the wavelength range of interest may be at least 25%, or at least 35%, or at least 50%, or may be even higher, if desired, for example at least 60%, or at least 70%, or at least 75%, or at least 80%.

In various aspects, the wavelength range of interest may be, for example, from 400 nm to 450 nm, or from 450 nm to 500 nm, or from 500 nm to 550 nm, or from 550 nm to 600 nm, or from 580 nm to 700 nm, or from 500 nm to 600 nm, or from 525 nm to 575 nm, or as defined elsewhere herein. While some of the wavelength ranges just cited are 50 nm wavelength ranges, other wavelength ranges may be selected, as described here and elsewhere herein.

Similarly, the overall amount of visible light transmitted, or $T_{vis}$, may likewise vary widely. Thus, the $T_{vis}$ of the optical products of the invention may be at least 20%, or at least 30%, or at least 50%, or at least 60%, or at least 75%, or at least 80%, or alternatively may be no more than 10%, or no more than 20%, or no more than 30%, or as defined elsewhere herein.

The light measurements, as used herein, are those determined using the 1976 CIE L*a*b* Color Space. CIE L*a*b* is an opponent color system based on the earlier (1942) system of Richard Hunter called L, a, b. In the CIE L*a*b* color space, the three coordinates represent: the lightness of the color (L*=0 yields black and L*=100 indicates diffuse white); its position between red and green (a*, negative values indicate green while positive values indicate red); and its position between yellow and blue (b*, negative values indicate blue and positive values indicate yellow).

As used herein, the color reflection value is calculated from the formula $\text{sqrt}[(a^*)^2+(b^*)^2]$. For example, the color reflection value of an optical product or a bilayer having a reflective a* value of 0.5 and a reflective b* value of −0.5 would be 0.71, which is relatively neutral, while an optical product having a reflective a* value of 1.5 and a reflective b* value of −1.5 would have a color reflection value of 2.1 which, while still relatively neutral, is less neutral than the optical product having a color reflection value of 0.71. Relatively neutral color reflection values according to the invention, whether those used to describe the finished optical products or the pigment or pigment blends that comprise individual bilayers, are those that are less than about 5, or less than 4, or less than or equal to 3, and especially values that are less than about 2.5, or less than about 2, or less than or equal to 1.5. Thus, the lower the color reflection value, the more neutral is the perceived color. So far as we are aware, this color reflection value and the formula for determining it have not been used previously, although the values used to calculate this color reflection value are generally-accepted measured values using the 1976 CIE L*a*b* Color Space, that is the a* and b* values, and as a practical matter are probably the most common way of defining color that is in use today.

The color reflection value just described is thus used according to the invention to determine whether the optical products of the invention have a suitably neutral reflection. The measurement is also used herein to determine the suitability of the pigment or pigment blends used in individual bilayers or a plurality of bilayers of the same pigment composition. In this measurement, a bilayer or plurality of bilayers is formed from the pigment or pigments on a suitable substrate, as further described herein, and a measurement obtained.

According to various aspects of the invention, optical products are thus provided that comprise composite coatings, deposited on a substrate, for example a polymeric substrate. These composite coatings comprise bilayers that include a first layer and a second layer, each provided with a binding group component which together form a complementary binding group pair. In one aspect, the multiple bilayers may comprise, in sequence: at least one bilayer a) comprised of a neutral pigment or pigment blend that, when formed into a bilayer, exhibits a color reflection value that is less than about 2.5; at least one bilayer b) comprised of a pigment or pigment blend that, when formed into a bilayer, selectively blocks visible light in a wavelength range of interest; and at least one bilayer c) comprised of a neutral pigment or pigment blend that, when formed into a bilayer, exhibits a color reflection value that is less than about 2.5, and that may be the same as or different than the pigment or pigment blend of the bilayer a). According to this aspect, the optical product just described selectively blocks visible light in a wavelength range of interest, while exhibiting a relatively low color reflection value that may be, for example, less than about 2.5.

Those skilled in the art will readily appreciate that further alternating bilayers of similar character may be added in sequence, such that the optical product may further comprise, for example deposited on bilayer a) or bilayer c): d) at least one bilayer comprised of a pigment or pigment blend that, when formed into a bilayer, selectively blocks visible light in the wavelength range of interest, and that may be the same as or different than the pigment or pigment blend of the bilayer b); and e) at least one bilayer comprised of a neutral pigment or pigment blend that, when formed into a bilayer, exhibits a color reflection value that is less than about 2.5, and that may be the same as or different than the pigment or pigment blend of the bilayer a) and the bilayer c).

When we say that the bilayers described in a) and c), and in optional bilayer e), above are comprised of a neutral pigment or pigment blend, we mean that the nature of the pigment or pigments is such that the reflectance of a bilayer or plurality of bilayers formed from them is relatively neutral, as defined by the color reflection value already described. That is, in determining whether a neutral pigment or pigment blend is suitable for use according to the invention, the pigment or pigments are formed into a bilayer on a suitable substrate and the color reflection value is determined. The measurement is thus taken, for purposes of determining whether a given pigment or pigment blend is suitable for use according to the invention, on an isolated bilayer or bilayers, and not as incorporated into the finished optical product.

Similarly, with respect to the at least one bilayer b), and optional bilayer d), when determining whether a pigment or pigment blend is suitable for use according to the invention, a bilayer or plurality of bilayers is formed from the pigment or pigments, and the ability of the bilayer to selectively block visible light in a wavelength range of interest is determined. The measurement is thus taken, for purposes of determining whether a given pigment or pigment blend is suitable to selectively block visible light in a wavelength range of interest, on an isolated bilayer or plurality of bilayers, and not on the finished optical product. We note, however, that the color reflection value of the finished optical product is also determined in the same way.

Thus, when selecting a neutral pigment or pigment blend for use according to the invention, the measured color reflection value of an individual bilayer a) or c) or e) is considered, or a plurality of bilayers a) or c) or e), as the case may be. This color reflection value may vary slightly based on the number of bilayers of each of the two types of bilayers a) and c) and e) present, but any number of bilayers may be used according to the invention, so long as the measured color reflection value of a bilayer or plurality of bilayers formed from the pigment(s) is within the desired range.

The value of a measured color reflection value will also vary, when measured on a finished optical product, based on the nature of the bilayer b), and optional bilayer d), including the nature of the pigment itself and the number of bilayers in the at least one bilayer b) or d). Thus, the neutrality of the bilayers a) and c) and e) are defined herein based on measurements of the bilayers or plurality of bilayers a) and c) and e) themselves, in the absence of bilayer b) or d), while the overall neutrality of the optical product obtained is based on the color reflection value of the final optical product itself. In this aspect, the composite coating may be considered a sandwich structure, or an interleaved structure, in which bilayer b) or d), comprised of a pigment or pigment blend that selectively blocks visible light in a wavelength range of interest, is sandwiched between bilayers a) and c) or c) and e), as the case may be, comprised of a neutral pigment or pigment blend that may be the same as or different from one another. These sandwiched or interleaved composite coating structures thus comprise at least one a) bilayer, one b) bilayer, and one c) bilayer, for a total of at least three bilayers, and optionally additional bilayers, for example bilayers d) and e) as just described.

In various aspects, the present invention is thus directed to optical products comprising a polymeric substrate provided thereon with a composite pigment coating. The composite pigment coatings are comprised of at least a first layer and a second layer which together form a single bilayer, at least one of which layers comprises or includes a pigment or pigment blend. Preferably, the first layer is immediately adjacent the substrate and a second layer is immediately adjacent to the first layer which was applied to or deposited on the substrate. Each of the first and second layers together thus form a bilayer. One or more additional first and second layers may thus be used to form a plurality of bilayers. Each of these bilayers or the plurality of bilayers taken together may also be described herein as a bilayer system, a composite coating, or an LbL (layer-by-layer) coating. As described, each of the bilayers can be the same or different.

According to the invention, the composite pigment coating comprises a layer-by-layer coating that includes one or more pigments. Each of the layers of a given bilayer may comprise a polyionic binder, an insoluble pigment particle, or both. Each layer of the bilayer(s) includes a binding group component with the binding group component of the first layer and the binding group component of the second layer constituting a complementary binding group pair. As used herein, the phrase "complementary binding group pair" means that binding interactions, such as electrostatic binding, hydrogen bonding, Van der Waals interactions, hydrophobic interactions, and/or chemically-induced covalent bonds are present between the binding group component of the first layer and the binding group component of the second layer of the composite coating. A "binding group component" is a chemical functionality that, in concert with a complementary binding group component, establishes one or more of the binding interactions described above. The components are complementary in the sense that binding interactions are created through their respective charges.

According to the invention, the binding group component may be provided, for example, through a polyionic binder or a pigment. That is, if a selected pigment is charged, for example, so that it can serve as a binding group component of a given layer of the bilayer system, then that pigment may be used alone to form a layer of the bilayer. If the pigment does not include a binding group component, then that pigment may be combined with a molecule having a binding group component, for example a polyionic binder, to form a bilayer. We note that not every bilayer of the bilayer system need include a pigment, but according to the invention, those bilayers that include a pigment may have either a charged pigment or an uncharged pigment, or both.

According to the invention, a layer of the composite pigment coating may thus include a polyionic binder, which is defined as a macromolecule containing a plurality of either positively- or negatively-charged moieties along the polymer. Polyionic binders with positive charges are known as polycationic binders while those with negative charges are termed polyanionic binders. Also, it will be understood by one of ordinary skill that some polyionic binders can function as either a polycationic binder or a polyanionic binder, depending on factors such as pH, and are known as amphoteric. The charged moieties of the polyionic binder constitute the "binding group component" of a given layer.

Suitable polycationic binder examples include poly(allylamine hydrochloride), linear or branched poly(ethyleneimine), poly(diallyldimethylammonium chloride), macromolecules termed polyquaterniums or polyquats and various copolymers thereof. Blends of polycationic binders are also contemplated by the present invention.

Suitable polyanionic binder examples include carboxylic acid-containing compounds such as poly(acrylic acid) and poly(methacrylic acid), as well as sulfonate-containing compounds such as poly(styrene sulfonate) and various copolymers thereof. Blends of polyanionic binders are also contemplated by the present invention. Polyionic binders of both polycationic and polyanionic types are generally known to those of ordinary skill in the art and are described, for example, in U.S. Published Patent Application number US20140079884 to Krogman et al, incorporated herein by reference. Examples of suitable polyanionic binders include polyacrylic acid (PAA), poly(styrene sulfonate) (PSS), poly (vinyl alcohol) or poly(vinylacetate) (PVA, PVAc), poly (vinyl sulfonic acid), carboxymethyl cellulose (CMC), polysilicic acid, poly(3,4-ethylenedioxythiophene) (PEDOT) and combinations thereof with other polymers (e.g. PEDOT: PSS), polysaccharides, and copolymers of the above mentioned. Other examples of suitable polyanionic binders include trimethoxysilane functionalized PAA or PAH or biological molecules such as DNA, RNA or proteins. Examples of suitable polycationic binders include poly (diallyldimethylammonium chloride) (PDAC), Chitosan, poly(allyl amine hydrochloride) (PAH), polysaccharides, proteins, linear poly(ethyleneimine) (LPEI), branched poly (ethyleneimine) BPEI and copolymers of the above-mentioned, and the like. Examples of polyionic binders that can function as either polyanionic binders or polycationic binders include amphoteric polymers such as proteins and copolymers of the above mentioned polycationic and polyanionic binders.

The concentration of the polyionic binder in the first layer may be selected based in part on the molecular weight of its charged repeat unit but will typically be between 0.1 mM-100 mM, more preferably between 0.5 mM and 50 mM, and most preferably between 1 and 20 mM based on the molecular weight of the charged repeat unit.

According to the invention, if the binding group component of a given layer includes a negatively-charged pigment, then the polyionic binder of a complementary layer will typically be a polycationic binder, such as polyallylamine hydrochloride. The polyionic binders will typically be soluble in water and the composition used to form the layer will be an aqueous solution of polyionic binder. In an embodiment wherein the polyionic binder is a polycation and the first layer is formed from an aqueous solution, the pH of the aqueous solution may be selected so that from 5 to 95%, preferably 25 to 75%, and more preferably approximately half of the ionizable groups are protonated. Other optional ingredients in the first layer include biocides or shelf-life stabilizers.

It will be understood that when the first layer of a bilayer comprises a polycationic binder, the second layer may comprise a polyanionic binder or a negatively-charged insoluble pigment particle, or both. Of course, additional functionality may be provided to the optical products of the invention in the composite pigment coating. For example, one or more of the layers will typically be provided with electromagnetic energy-absorbing insoluble pigment particles, which themselves may be charged particles. The phrase "electromagnetic energy-absorbing" means that the particle is purposefully selected as a component for the optical product for its preferential absorption at particular spectral wavelength(s) or wavelength ranges(s). The term "insoluble" is meant to reflect the fact that the particle does not substantially dissolve in the composition used to form a given layer and exists as a particle in the optical product structure. Of course, the term electromagnetic energy-absorbing insoluble particles encompasses pigments; however, insoluble particles such as UV absorbers or IR absorbers, or absorbers in various parts of the electromagnetic spectrum that do not necessarily exhibit color, are also within the term and may be provided according to the invention.

Pigments suitable for use according to the invention are preferably particulate pigments with an average particle diameter from about 5 to about 300 nanometers, or from 10 to 100 nanometers, often referred to in the art as nanoparticle pigments, although there is not necessarily an upper limit to the particle size in those cases where a larger particle size may perform well in the LbL processes useful according to the invention. In one aspect, the surface of the pigment includes the binding group component of a given layer. Suitable pigments are available commercially as colloidally-stable water dispersions from manufacturers such as Cabot, Clariant, DuPont, Dainippon and DeGussa. Particularly suitable pigments include those available from Cabot Corporation under the Cab-O-Jet® name, for example 250C (cyan), 265M (magenta), 270Y (yellow), 554B (blue), 1027R (red), or 352K (black). In order to be stable in water as a colloidal dispersion, the pigment particle surface is typically treated to impart ionizable character thereto and thereby provide the pigment with the desired binding group component on its surface. It will be understood that commercially available pigments are sold in various forms such as suspensions, dispersions and the like, and care should be taken to evaluate the commercial form of the pigment and modify it as/if necessary to ensure its compatibility and performance with the optical product components, particularly in the embodiment wherein the pigment surface also functions as the binding group component of the second layer.

Multiple pigments or pigment blends will be utilized to achieve the selective blocking of visible light with relatively neutral reflection, as already described. However, it will again be understood that, should multiple pigments be used, they should be carefully selected to ensure their compatibility and performance both with each other and with the optical product components. This is particularly relevant in the embodiment wherein the pigment surface also functions as the binding group component of the layer, as for example particulate pigments can exhibit different surface charge densities due to different chemical modifications that can impact compatibility.

One or more of the layers of the LbL composite pigment coating may further include a screening agent that promotes even and reproducible deposition of the layer via improved dispersion of the pigment or polyionic binder within the layer by increasing ionic strength and reducing interparticle electrostatic repulsion. Screening agents are known to those of ordinary skill in the art and are described for example in U.S. Published Patent Application number US20140079884 to Krogman et al. Examples of suitable screening agents include low molecular weight salts such as halide salts, sulfate salts, nitrate salts, phosphate salts, fluorophosphate salts, and the like. Examples of halide salts include chloride salts such as LiCl, NaCl, KCl, $CaCl_2$, $MgCl_2$, $NH_4Cl$ and the like, bromide salts such as LiBr, NaBr, KBr, $CaBr_2$, $MgBr_2$, and the like, iodide salts such as LiI, NaI, KI, $CaI_2$, $MgI_2$, and the like, and fluoride salts such as, NaF, KF, and the like. Examples of sulfate salts include $Li_2SO_4$, $Na_2SO_4$, $K_2SO_4$, $(NH_4)_2SO_4$, $MgSO_4$, $CoSO_4$, $CuSO_4$, $ZnSO_4$, $SrSO_4$, $Al_2(SO_4)_3$, and $Fe_2(SO_4)_3$. Organic salts such as $(CH_3)_3CCl$, $(C_2H_5)_3CCl$, and the like are also suitable screening agents. Sodium chloride is typically a preferred screening agent based on ingredient cost. The presence and concentration level of a screening agent may allow for higher loadings of the pigment or the binder such as those that may be desired in optical products with a $T_{vis}$ of no more than 50% and also may allow for customizable and carefully controllable loadings in order to achieve customizable and carefully controllable optical product $T_{vis}$ levels.

Suitable screening agent concentrations can vary with salt identity and are also described for example in U.S. Pat. No. 9,387,505 to Krogman et al, incorporated herein by reference in its entirety. In some embodiments, the screening agent concentration can range between 1 mM and 1000 mM or between 10 mM and 100 mM or between 30 mM and 80 mM. In some embodiments the screening agent concentration is greater than 1 mM, 10 mM, 100 mM or 500 mM.

The layers of the composite pigment coating may also contain other ingredients such as biocides or shelf-life stabilizers.

As noted, the composite pigment coatings of the invention may comprise a plurality of bilayers that may be the same or different. For example, an optical product of the invention may include first and second bilayers, each with a first layer and a second layer. For embodiments with a plurality of bilayers, it will be appreciated that the binders or pigments for each of the layers of a bilayer may be independently selected and that the layers containing pigment, for example, will in combination provide an additive effect to the user of the optical product. This additive effect can be customized and carefully controlled in part by the concentration of the pigment particles in each of the layers used as dispersed through the presence of the screening agent. For example, pigmented layers will, in combination, provide approximately an additive effect on the user's visually perceived color, that is, on the transmission of the film. In embodiments in which a plurality of bilayers is provided that include pigments, the pigments for each of the layers may be of the same or similar composition and/or color such that the additive effect is to increase intensity or depth or darkness of the visually perceived transmission of the optical product or, stated another way, to reduce electromagnetic transmittance in the visible wavelength range (or $T_{vis}$).

In one embodiment, carbon black may be used as a pigment for at least one layer, for example a layer in which the reflection is intended to be relatively neutral as evidenced by its color reflection value. Similarly, blends of pigments such as those discussed herein may be used together to obtain a bilayer or plurality of bilayers having a relatively neutral reflection. Pigments such as those listed above can also be used alone or as blends to obtain a bilayer or a plurality of bilayers that selectively block visible light in a wavelength range of interest. In general, the additive effect of multiple bilayers to the user is a visually perceived darkened color, reducing electromagnetic transmittance in the visible wavelength range (or $T_{vis}$). As discussed above, the present invention may be useful in products wherein relatively high levels of darkening are desired. Accordingly, in one embodiment, the optical products of the present invention have a $T_{vis}$ of no more than 50%, or no more than 70%.

FIG. 1 depicts the percent of light absorbed over the visible wavelength range of five different pigments formed into approximately 200 nm thin films comprised of five bilayers. Each of these pigments is suitable for use according to the invention to form a first or second layer of a bilayer, either alone or in combination. These pigments may be used, for example, in blends selected to achieve a bilayer having a relatively neutral reflection, as defined by its color reflection value. They may likewise be used alone or in blends to obtain a bilayer that selectively blocks light within a wavelength range of interest. They also may each be used together with at least two other pigments to obtain a blend that when formed into a bilayer both selectively blocks visible light in a wavelength range of interest, while at the same time achieving a relatively neutral reflection, as evidenced by a relatively low color reflection value. This blend aspect is being separately pursued in a copending application filed herewith having common assignee, the contents of which are incorporated herein by reference.

It can be seen that each of the five pigments in FIG. 1 exhibits a unique absorption curve, as certain portions of the visible spectrum are absorbed more strongly than others. When selecting a pigment or pigment blend that selectively blocks visible light in a wavelength range of interest, absorption curves of this type may be used to help select the appropriate pigment. For example, in FIG. 1 it can be seen that the yellow pigment 270Y strongly absorbs in the wavelength range from 400 nm to 450 nm, making it a suitable pigment to block visible light within this wavelength range. Similarly, pigment 554B absorbs strongly in the wavelength range from 500 nm to 600 nm, making it a good choice to block visible light within this wavelength range.

Figure 2:
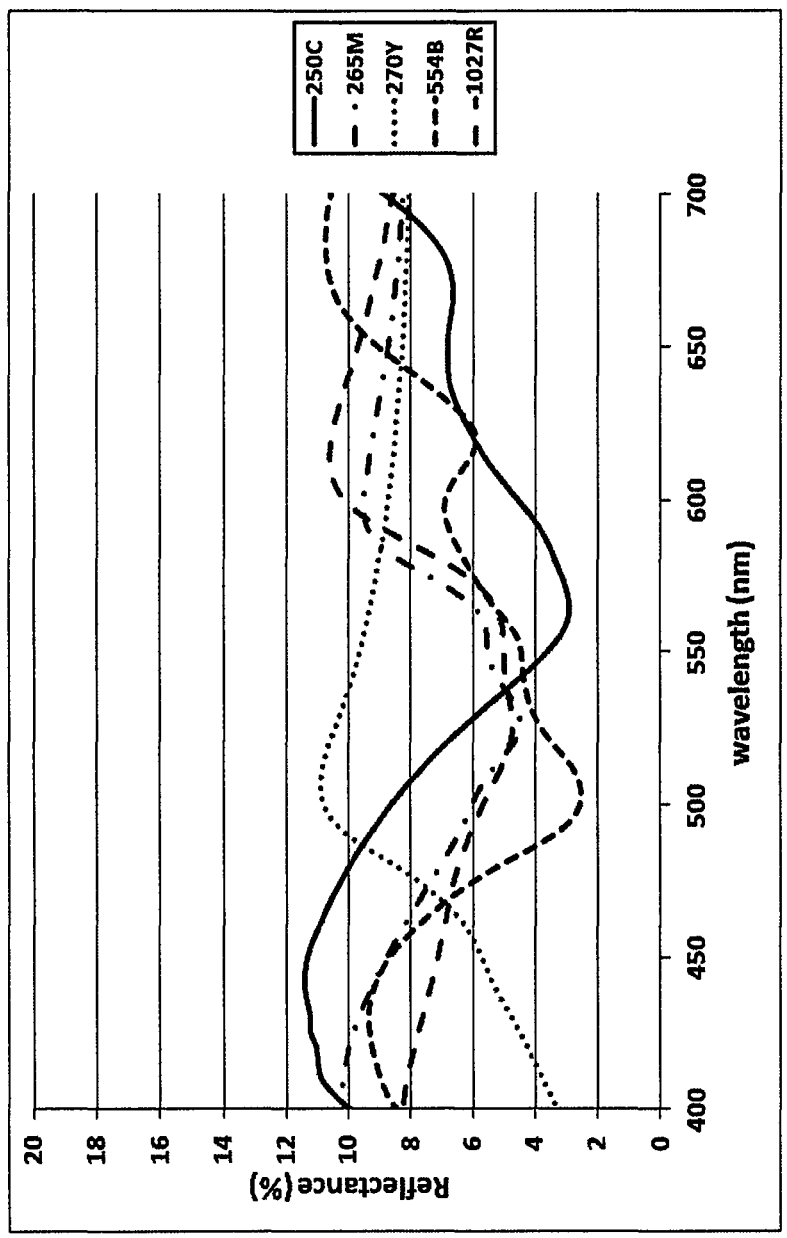
FIG. 2 is a plot of the percent of light reflected over the visible wavelength range of thin films made from five pigments that are useful according to the invention.

FIG. 2 depicts the percent of light reflected over the visible wavelength range for the same thin films for which the absorbance is depicted in FIG. 1. It can be seen that each of the five pigments in FIG. 2 exhibits a colored reflection, as opposed to a neutral reflection, as certain portions of the visible spectrum are reflected more strongly than others. These measured reflective properties may be used as a starting point when creating a pigment blend with suitable reflectance properties. However, the reflectance properties of a given bilayer, or of the finished optical products of the invention, may also be, in part, a function of interference that may also be occurring based on the thickness of the layers or bilayers and the refractive index of the pigment(s). Therefore, a certain amount of routine experimentation may be helpful when creating a pigment blend to obtain a bilayer having the desired neutrality, or color reflection value. Those skilled in the art will be readily able to select suitable pigments or pigment blends for use according to the invention using the relevant absorption and reflectance curves.

Figure 3:
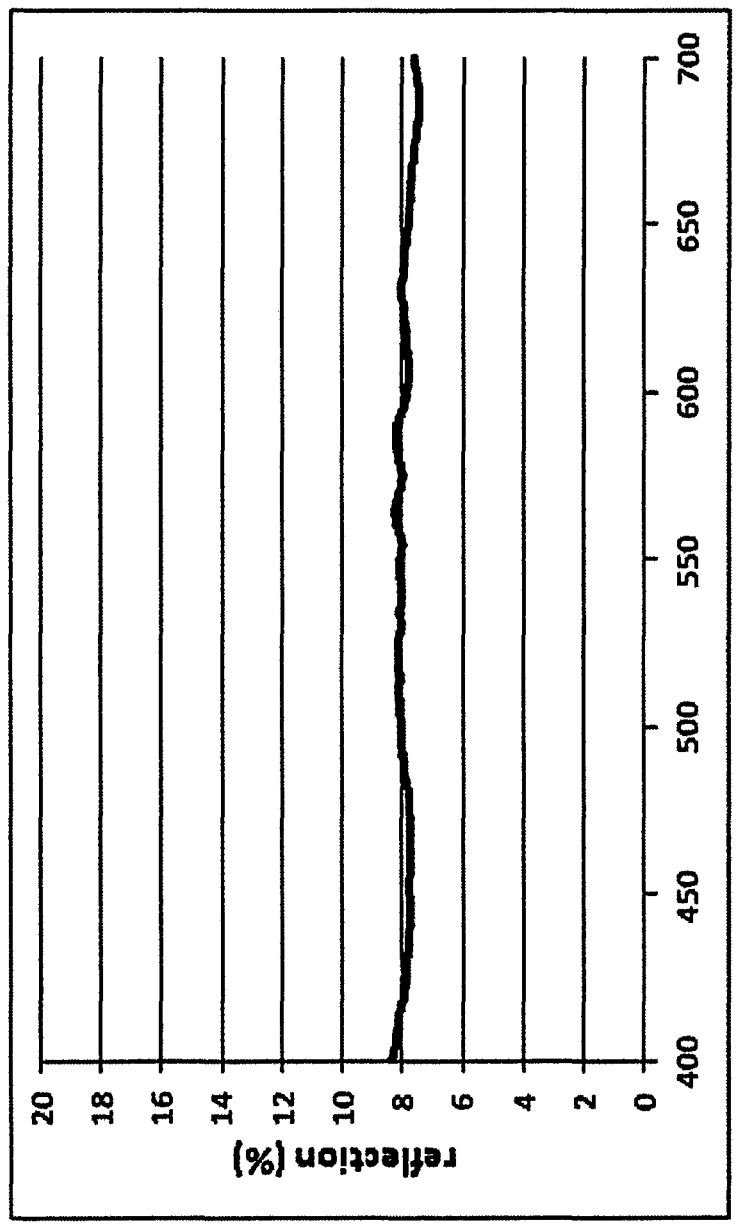
FIG. 3 is a plot of the percent of light reflected over the visible wavelength range of a thin film made from a blend of three pigments that is relatively neutral in reflectance across the visible spectrum.

In FIG. 3 we see that, when three of the five pigments of FIGS. 1 and 2 (yellow pigment 270Y, magenta pigment 265M, and cyan pigment 250C) are blended together, in an approximate ratio of 1:1:1 by pigment mass, into a single layer, no single pigment is dominant, and the bulk reflection becomes relatively neutral (sqrt(($a*$)$^2$+($b*$)$^2$)=0.8). This can be seen graphically, since the percent reflection across the visible spectrum is approximately the same. This is but one example of a pigment blend useful according to the invention to provide a bilayer having a relatively neutral reflection, as evidenced by its color reflection value.

Figure 4:
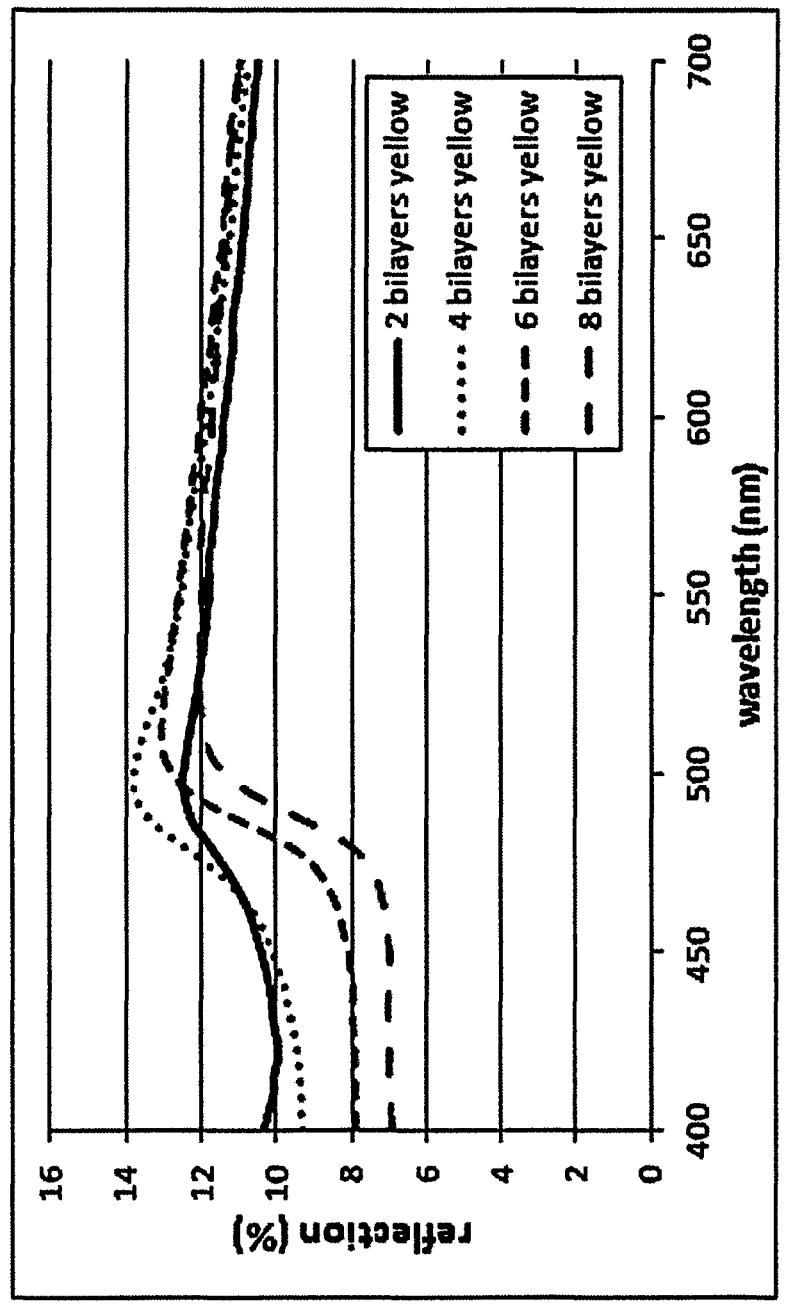
FIG. 4 is a plot of the amount of light reflected along the visible spectrum for 2, 4, 6, and 8 layers of a yellow pigment useful according to the invention.

FIG. 4 depicts the amount of light reflected along the visible spectrum for 2, 4, 6, and 8 layers of yellow pigment 270Y that is useful according to the invention. It can be seen that increasing the absorptive ability of a layer-by-layer stack by adding additional yellow layers will result in a yellow reflection from the surface of the composite. However, the reflectance seen may in part be a result of thin-film interference that is a function of the thickness of a given layer or layers, and the refractive index of the pigment. Shown here, incrementally increasing the thickness of a yellow film 2 bilayers at a time, we see the reflected color is not entirely consistent. Adding very thin layers of pigment, for example 2 or 4 bilayers, may serve to reduce this effective reflectance effect. If more layers are desired, minor changes in formulation, for example of the neutral pigment blend, may be helpful in obtaining an optical product that blocks visible light within a wavelength range of interest while obtaining a suitably neutral color reflection value.

Thus, the present invention relates to optical products such as window films that include a polymeric substrate, for example PET or PVB, provided with a composite pigment coating, comprising at least one, and preferably a plurality, of layer-by-layer (LbL) bilayers deposited on the protective coating, at least one of which layers is or has incorporated into it a pigment. Each of the layers, as described herein, can be understood to have two faces, a first face and a second face, for the purpose of describing adjacent layers that each of the layers may be in contact with. Similarly, the finished optical products of the invention likewise have a first face and a second face, and may in general be applied to an automobile window or architectural window, for example, in either direction. When measuring a given optical product to determine whether its properties fall within the scope of the claims, the measurements may be those taken from either direction, and in some aspects of the invention, similar measurements will be obtained from both faces, although in other embodiments the desired properties may be obtained only when measured from one direction, and not the other.

Figure 5:
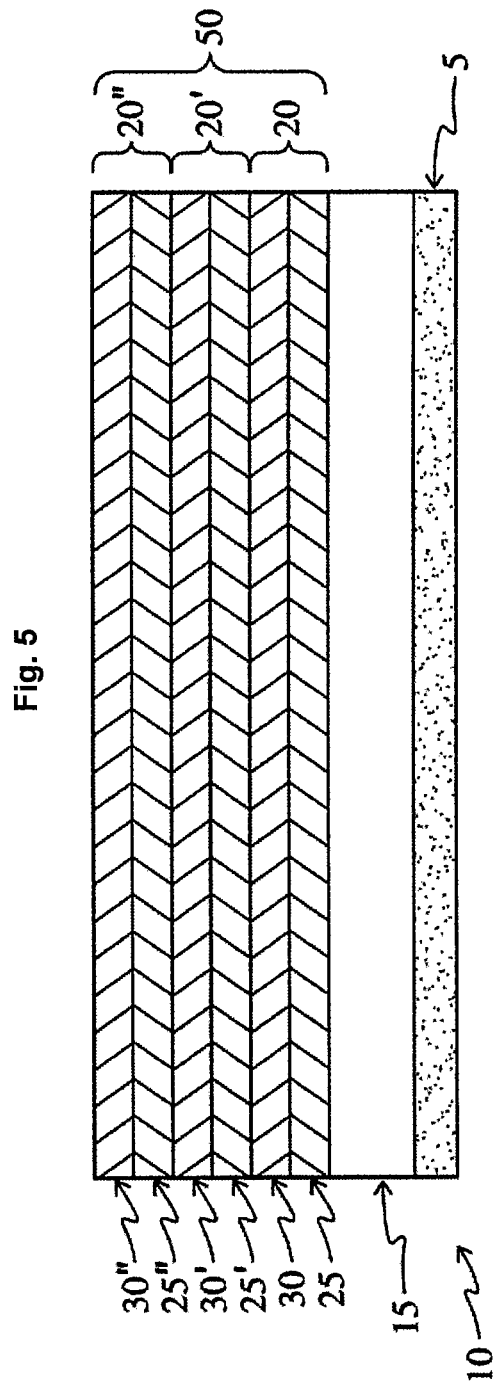
FIG. 5 is a schematic drawing that depicts a window film that is one embodiment of the present invention.

Referring now to FIG. 5, a schematic drawing which is not to scale, in one embodiment the present invention relates generally to optical products such as a window film 10. The window film 10 includes a polymeric substrate 15, for example PET, provided with a composite pigment coating 50, comprising a plurality of at least three layer-by-layer (LbL) bilayers 20, 20', 20" deposited on the protective coating, each of which layers is or has incorporated into it a pigment. Each of the bilayers 20, 20' 20" of the invention is further comprised respectively of a first layer 25, 25', 25" and a second layer 30, 30', 30". When used as an exterior or interior window film, the substrate may additionally have provided on its bottom an adhesive 5 for adhering the substrate to a window.

Referring still to FIG. 5, the multiple bilayers comprise, in sequence: a) at least one bilayer 20 comprised of a neutral pigment or pigment blend that, when formed into a bilayer, exhibits a color reflection value that is less than about 2.5; b) at least one bilayer 20' comprised of a pigment or pigment blend that, when formed into a bilayer, selectively blocks visible light in a wavelength range of interest; and c) at least one bilayer 20" comprised of a neutral pigment or pigment blend that, when formed into a bilayer, exhibits a color reflection value that is less than about 2.5, and that may be the same as or different than the pigment or pigment blend of the bilayer a). According to this aspect, the optical product just described selectively blocks visible light in a wavelength range of interest, while exhibiting a relatively low color reflection value that may be, for example, less than about 2.5. This reflectance property may be satisfied when the measurement is taken of the window film from either direction, or from both directions.

As depicted in FIG. 5, each of the bilayers 20, 20', and 20", is comprised respectively of a first layer 25, 25', and 25", and a second layer 30, 30', and 30". According to the invention, either the first layer 25, 25', 25", or the second layer 30, 30', 30", or both the first and second layer of each bilayer 20, 20', 20", will include the pigments or pigment blends just described. It will be understood that in the simplest aspect, the invention comprises three bilayers 20, 20', and 20", which correspond to bilayers a), b), and c) as just described. However, each or any of these three bilayers may be comprised of more than one bilayer, so long as the plurality of bilayers satisfies the conditions stated above. Similarly, there may be interposed, between any or each of these, further bilayers that may be the same as or different than those just described, so long as the three bilayers are present in the stated sequence, and the resulting optical product obtains the desired color reflectance value. As already noted, additional bilayers d) and e) may optionally be present, as well, and may correspond generally to additional bilayers in which bilayer d) is comprised of at least one bilayer comprised of a pigment or pigment blend that, when formed into a bilayer, selectively blocks visible light in a wavelength range of interest; and bilayer e) comprised of a neutral pigment or pigment blend that, when formed into a bilayer, exhibits a color reflection value that is less than about 2.5, and that may be the same as or different than the pigment or pigment blends of other bilayers.

The optical products of the invention may thus be films that are typically applied to the interior or exterior surface of a window, and preferably the interior. As noted, these films will be understood to have two faces, as does each of the layers of which the films are comprised.

When used as an exterior or interior window film, the substrate may additionally have provided on its bottom a means for adhering the substrate to a window. The optical product may thus have an adhesive layer provided on the substrate. The adhesive layer can be comprised of any adhesive that is suitable for bonding the substrate to a window. When being bonded to a window, pressure sensitive adhesives are preferable, with an acrylic-based adhesive being particularly preferable. Loctite Duro-Tak 109A (available from Henkel) is an example of such an adhesive. The adhesive layer may also have a release liner attached thereto. The release liner advantageously provides a release effect against the sticky adhesive layer. The release liner in the depicted embodiment can comprise any polyethylene terephthalate (PET) film with a silicone release coating that can be peeled from the adhesive layer leaving the adhesive layer on the base substrate. Alternatively, the adhesive and release layers may comprise a clear distortion-free adhesive with a polypropylene liner.

The present invention typically includes a polymeric substrate, preferably a film formed from a thermoplastic such as a polyester and preferably polyethylene terephthalate (PET). Suitable PET films are commercially available, for example from DuPont Teijin Films under the names Melinex 454 or LJX 112. Other suitable thermoplastics for forming the polymeric substrate include, for example, polyvinyl butyral, polyacrylic, polyimides, polyamides such as nylons, and polyolefins such as polyethylenes, polypropylenes and the like. The polymeric substrate may include conventional additives such as UV-absorbers, stabilizers, fillers, lubricants and the like, blended therein or coated thereon. Preferably, the polymeric substrate is transparent, which generally connotes the ability to perceive visually an object, indicia, words or the like through it.

The polymeric substrate may in the broadest sense be any substrate known in the art as useful as an optical product component. A suitable polymeric substrate is typically a flexible thermoplastic polymeric film, more particularly a polyethylene terephthalate (PET) film of a thickness, for example, from about $10\mu$ to about $400p$, or from $15\mu$ to $300p$, or from $20\mu$ to $250\mu$; or a polyvinyl butyral (PVB) film, preferably of a thickness from 0.01 to 1 mm, or from 0.05 to 0.5 mm, or from 0.1 mm to 0.45 mm, and more preferably a thickness of 15 to 30 mils. Because window films that employ dyes exhibit a variety of drawbacks, the polymeric substrate is preferably an undyed transparent polyethylene terephthalate film. The term "undyed" means that the raw film has no appreciable color, and is not intended to exclude the presence of additives such as UV blockers that are present in small amounts and not intended to affect the appearance of the film. The polymeric substrate may also be a flexible polyurethane or flexible poly(vinyl chloride) film or may be a flexible multilayer polymeric composite film such as a polyurethane-based multilayer composite film as described for example in U.S. Pat. No. 8,765,263, the disclosure of which is incorporated herein by reference.

The polymeric substrate may further include additives known in the art to impart desirable characteristics. Examples include ultraviolet (UV) absorbing materials such as benzotriazoles, hydroxybenzophenones or triazines. A useful polymeric substrate with a UV absorbing additive incorporated therein is described in U.S. Pat. No. 6,221,112, which is incorporated herein by reference.

In one embodiment, wherein the polymeric substrate is a flexible polymeric film such as PET, the optical product may be a window film. As well known in the art, conventional window films are designed and manufactured with levels of electromagnetic energy transmittance or reflectivity that are selected based on a variety of factors such as, for example, product end-use market applications, and the like. In some settings, the desired optical properties include maximum rejection (reflection) of infrared wavelengths with less attention being paid to the amount of visible light transmitted or reflected. In other applications, specific degrees of visible light transmittance must be attained to meet government regulations, for example, in auto windshields in which regulations may require that the $T_{vis}$ be 70% or greater. According to the present invention, the optical products of the invention selectively block visible light in a wavelength range of interest, while exhibiting a relatively neutral color reflection.

The visible light transmission (VLT or $T_{vis}$) is the spectral transmission in which the effect of each wavelength across the visible spectrum is weighted according to the eye's sensitivity to that wavelength. That is, it is the amount of light that is "seen" to be transmitted through the window film/glass system. The lower the number, the less visible light transmitted. It may be calculated using CIE Standard Observer (CIE 1924 1931) and D65 Daylight. As noted, the optical products of the present disclosure may have a visible light transmission within a broad range of VLT values, depending on the desired transparency, for example less than about 1%; from about 2% to about 5%; from about 25% to about 50%; about 28.5% to about 47%; about 30% to about 45%; about 28.5%; about 47%; about 55%; up to about 70%; or up to about 75%, or up to about 90%, or as described elsewhere herein.

In other embodiments, the optical product of the present invention may have visible light transmittance ($T_{vis}$ or VLT) of no more than 50%, or no more than 45% or no more than 40%. Such levels of visible light transmittance are often desired in window films with high levels of darkening for certain automotive end use applications such as sidelights.

In another embodiment, the optical product of the present invention has visible light transmittance or $T_{vis}$ of from 80 to 85%. Such levels of visible light transmittance are often desired in window films with relatively moderate to low levels of darkening (typically also with infrared absorption) for (to the extent permitted by governmental regulation) certain automotive end use applications such as windscreens. In yet another embodiment, the optical product of the present invention has visible light transmittance or $T_{vis}$ of no less than 85%, or no less than 88% or no less than 90%. Such levels of visible light transmittance are often desired in window films with low to minimal levels of darkening for certain architectural end use applications. These various levels of visible light transmission may be achieved according to the invention through a reduction in visible light transmission achieved by the composite pigment coating.

The window films may optionally include further layers or coatings, other than any protective coating layer and the composite pigment coating, that are known to those of ordinary skill in the window film art. Coatings, for example, may include adhesive layers, protective release liners, and the like, as described herein. Such layers or coatings may be components of the polymeric substrate. Further, the polymeric substrate may be a laminated or multilayer structure.

In another embodiment, the optical product is an interlayer for laminated glass. In this embodiment, the polymeric substrate is formed from or afterward bonded to a film-forming material known in the art for this purpose, including for example plasticized polyvinyl butyral (PVB), polyurethanes, polyvinyl chloride, polyvinylacetal, polyethylene, ethyl vinyl acetates and the like. A preferred film-forming material for the interlayer is a plasticized PVB such as that used in a commercially available product from Eastman Chemical Company, SAFLEX® PVB interlayer. In this embodiment, the composite coating may be formed on at least one surface of the polymeric substrate.

In an embodiment wherein the substrate is a flexible polymeric film such as PET, the optical product may be a composite interlayer for laminated glass including at least one safety film or interlayer. The safety film may be formed from film-forming materials known in the art for this purpose, including, for example, plasticized polyvinyl butyral (PVB), polyurethanes, polyvinyl chloride, polyvinylacetal, polyethylene, ethyl vinyl acetates and the like. The safety film may be a plasticized PVB film or interlayer commercially available from Eastman Chemical Company as SAFLEX® PVB interlayer. The composite interlayer may include two safety films or one film layer and one coating layer, such as a PVB coating, that encapsulate the polymeric substrate. Composite interlayers of this general type are known in the art and are described for example in U.S. Pat. Nos. 4,973,511 and 5,091,258, the contents of which are incorporated herein by reference.

The polymer substrates described herein may thus include one or more thermoplastic polymers. Examples of suitable thermoplastic polymers can include, but are not limited to, poly(vinyl acetal) resins (such as PVB), polyurethanes ("PU"), poly(ethylene-co-vinyl)acetates ("EVA"), polyvinyl chlorides ("PVC"), poly(vinyl chloride-co-methacrylate), polyethylene, polyolefins, ethylene acrylate ester copolymers, poly(ethylene-co-butyl acrylate), silicone elastomers, epoxy resins, and acid copolymers such as ethylene/carboxylic acid copolymers and ionomers thereof, derived from any of the previously-listed polymers, and combinations thereof. In some embodiments, the thermoplastic polymer can be selected from the group consisting of poly(vinyl acetal) resins, polyvinyl chloride, and polyurethanes, or the resin can comprise one or more poly(vinyl acetal) resins. Although some of the polymer layers may be described herein with respect to poly(vinyl acetal) resins, it should be understood that one or more of the above polymer resins and/or polymer layers including the polymer resins could be included with, or in the place of, the poly(vinyl acetal) resins described below in accordance with various embodiments of the present invention.

When the polymeric substrates described herein include poly(vinyl acetal) resins, the poly(vinyl acetal) resins can be formed according to any suitable method. Poly(vinyl acetal) resins can be formed by acetalization of polyvinyl alcohol with one or more aldehydes in the presence of an acid catalyst. The resulting resin can then be separated, stabilized, and dried according to known methods such as, for example, those described in U.S. Pat. Nos. 2,282,057 and 2,282,026, as well as Wade, B. 2016, Vinyl Acetal Polymers, Encyclopedia of Polymer Science and Technology. 1-22 (online, copyright 2016 John Wiley & Sons, Inc.). The resulting poly(vinyl acetal) resins may have a total percent acetalization of at least about 50, at least about 60, at least about 70, at least about 75, at least about 80, at least about 85 weight percent, measured according to ASTM D1396, unless otherwise noted. The total amount of aldehyde residues in a poly(vinyl acetal) resin can be collectively referred to as the acetal component, with the balance of the poly(vinyl acetal) resin being residual hydroxyl and residual acetate groups, which will be discussed in further detail below.

The polymeric substrates according to various embodiments of the present invention can further include at least one plasticizer. Depending on the specific composition of the resin or resins in a polymer layer, the plasticizer may be present in an amount of at least about 5, at least about 15, at least about 25, or at least about 35, or at least about 50, parts per hundred parts of resin (phr) and/or not more than about 120, not more than about 100, not more than about 90, not more than about 75, not more than about 70, or not more than about 55, not more than about 50, not more than about 45, or not more than about 40 phr, or in the range of from about 5 to about 120, about 10 to about 110, about 20 to about 90, or about 25 to about 75 phr.

As used herein, the term "parts per hundred parts of resin" or "phr" refers to the amount of plasticizer present as compared to one hundred parts of resin, on a weight basis. Further, when the plasticizer content of a polymer layer is provided herein, it is provided with reference to the amount of plasticizer in the mix or melt that was used to produce the polymer layer.

In another aspect, the present invention is directed to methods for forming optical products. In one embodiment, the method of the present invention includes applying to the protective layer a composite pigment coating. The composite pigment coating may be applied to the protective layer by applying a first layer to the protective layer and thereafter applying a second layer to form a bilayer. The process is then repeated until the desired number and nature of bilayers is achieved. The first layer of the bilayer may include a polyionic binder and/or a pigment, and the second layer may likewise include a binder and/or a pigment, with each of the first and second layers including a binding group component which together form a complementary binding group pair. At least one of the layers, and especially those layers that include a charged pigment particle, may include a screening agent as defined above.

In a preferred embodiment, at least one of the first and second layers are applied as an aqueous dispersion or solution and most preferably both of the first and second layers are an aqueous dispersion or solution. In this embodiment, both applying steps (a) and (b) are performed at ambient temperature and pressure.

The optical products of the present invention are thus preferably manufactured using known "layer-by-layer" (LbL) processes such as described in Langmuir, 2007, 23, 3137-3141 or in U.S. Pat. Nos. 8,234,998, 8,689,726 and 9,387,505, co-invented by co-inventor Krogman of the present application, the disclosures of which are incorporated herein by reference.

The following examples, while provided to illustrate with specificity and detail the many aspects and advantages of the present invention, are not be interpreted as in any way limiting its scope. Variations, modifications and adaptations which do depart of the spirit of the present invention will be readily appreciated by one of ordinary skill in the art.

The light measurements, as used herein, are calculated using the 1976 CIE L*a*b* Color Space convention, and were measured using a Perkin-Elmer Lambda 900 UV-Vis-NIR Spectrometer.

EXAMPLES

In Examples 1-3, we describe three techniques for constructing a film which blocks approximately 80% of blue light (between 400 and 450 nm, a wavelength range of interest of 50 nm), but only about 60% in the remainder of the spectrum. Employing an interleaved structure (Ex.1) results in a product which is substantially neutral in reflection, whereas grouping and separating the neutral and accent layers (Ex. 2 and Ex. 3) produces a colored reflection.

Example 1

To form the optical product of the present invention, a sheet of polyethylene terephthalate (PET) film (as substrate) with a thickness of 75 microns was pretreated as known in the art by passing through a conventional corona treatment. A first layer was then formed on the PET sheet by spray coating, at ambient pressure and temperature, a first coating composition of 20 mM solution, based on the molecular weight of the charged repeat unit, of polyallylamine hydrochloride with an adjusted pH of 9.5, as further described below. Excess non-absorbed material was rinsed away with a deionized water spray. A composition for use in forming the second layer, as described below, was then sprayed onto the surface of the first layer with excess material again rinsed away in a similar fashion.

In this example, the first coating composition for the first layer of the optical product was formed by dissolving 0.94 g of poly(allylamine hydrochloride) per liter of deionized water, and titrating the pH of the resulting solution to 9.5 using sodium hydroxide. A neutral second coating composition for forming the second layer of a neutral composite layer, a 0.5 wt % solids pigment blend dispersion of 6.07 g Cab-o-Jet 352K black, 10.85 g Cab-o-Jet 250C cyan, and 15.05 g Cab-o-Jet 265M magenta pigments in 1 L of distilled water, was also formed, with 2.92 g of sodium chloride added as screening agent to ionically screen the colloidal particles and prepare them for deposition. The 352K black pigment has ionizable carboxylate functionality at its surface while the 250C cyan pigment and 265M magenta pigment have ionizable sulfonate functionality at their respective surfaces. Titrating the second coating composition to pH 7.5 produces a scenario where approximately 75% of the Cab-o-Jet 352K black pigment ionizable carboxylate functionalities are ionized to form negative carboxylate groups, while 25% are not ionized and are present as carboxylic acids. This was found empirically to reduce the charge density on the black pigment to more closely match the sulfonate charge density on the cyan and magenta pigments. The above procedure may then be utilized to form an optical product with the first layer from the first composition above and a second layer formed from the pigment blend-containing second coating composition described above. This deposition process may be repeated for the substrate multiple times to deposit multiple composite coatings on the substrate and achieve increasing coloration with each repetition.

Figure 6:
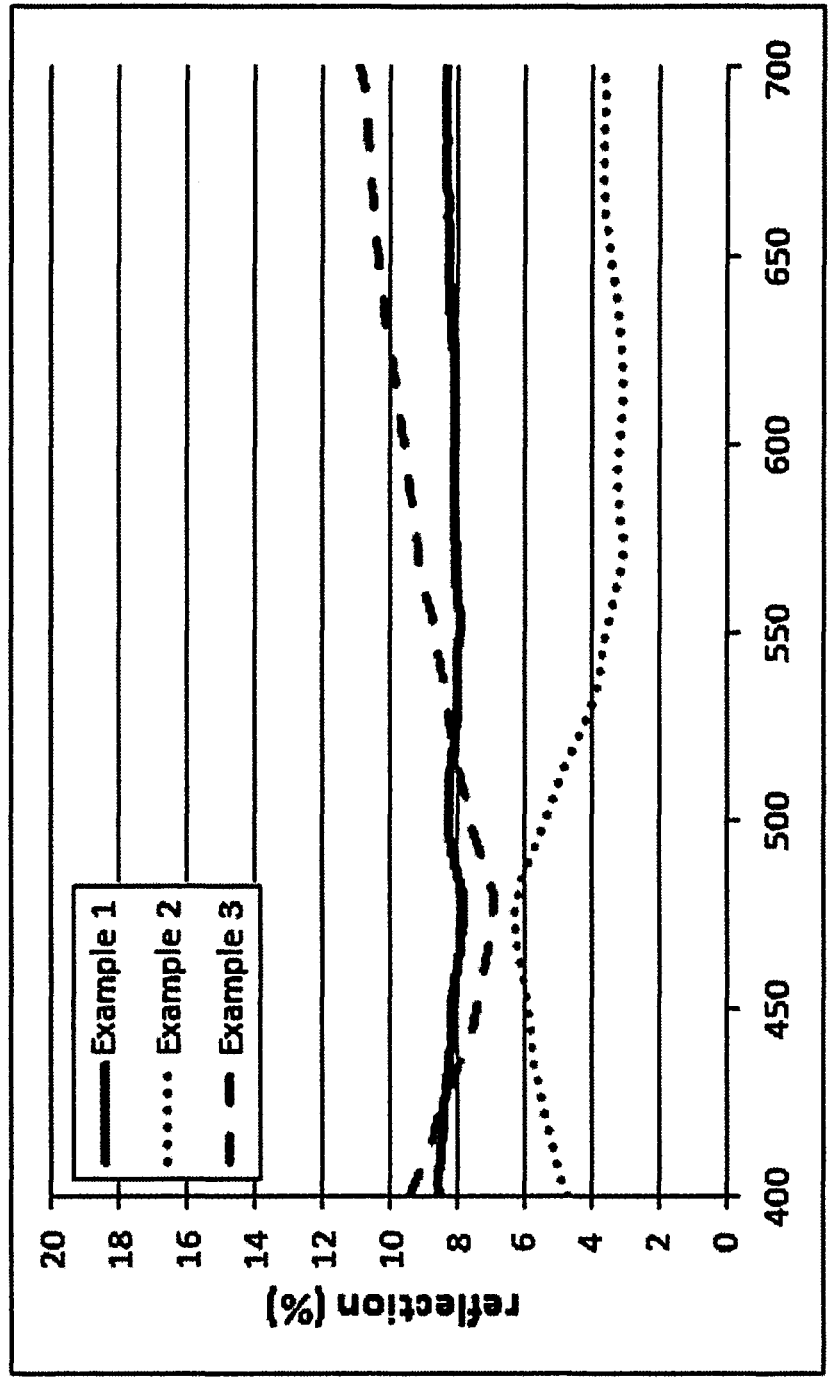
FIG. 6 is a plot of the percent of reflection of wavelengths along the visible spectrum for three films prepared in the examples.
Figure 7:
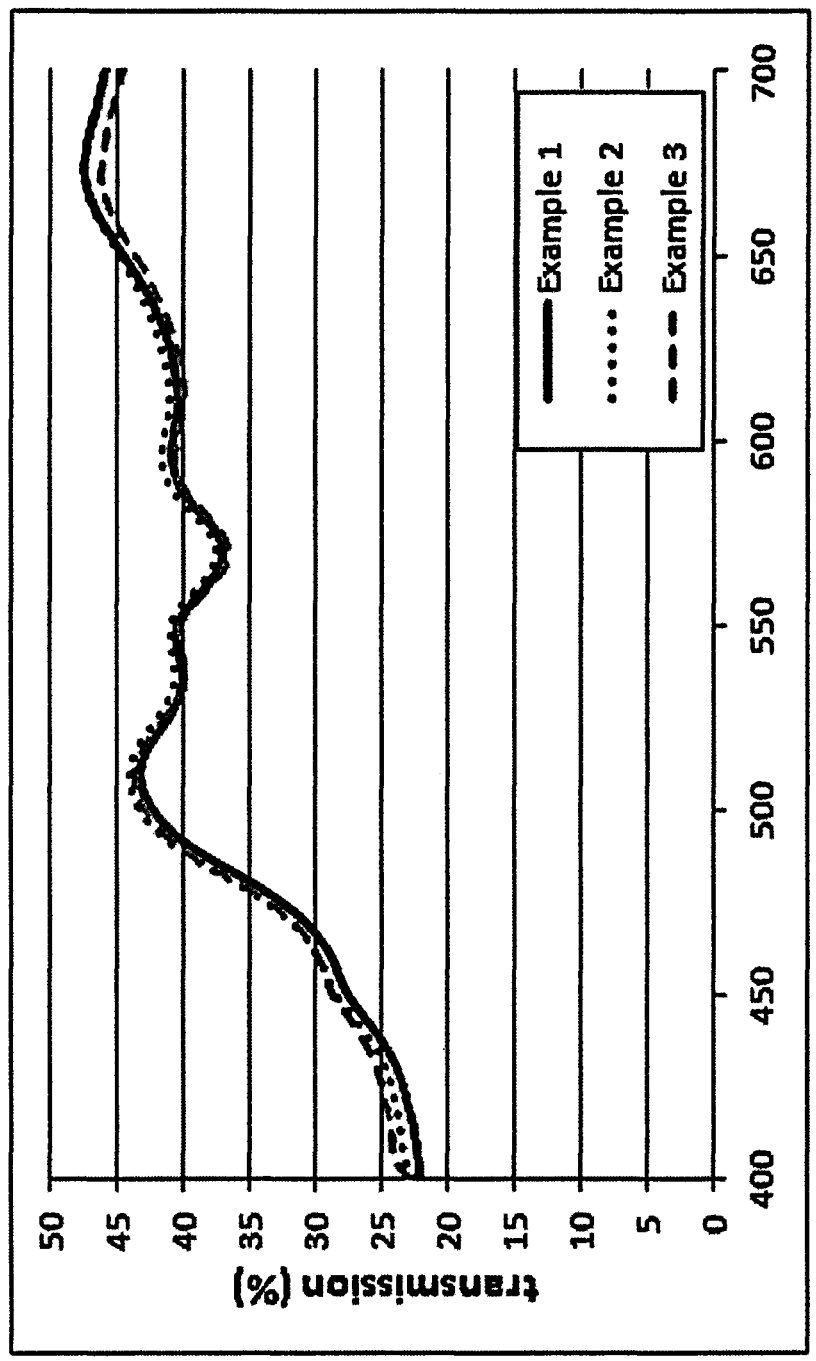
FIG. 7 is a plot of the percent transmission of wavelengths along the visible spectrum for three films prepared in the examples.

Similarly, another second coating composition for forming the second layer of an "accent" or "blocking" composite layer, a 0.5 wt % solids pigment dispersion of 35.0 g Cab-o-Jet 270Y yellow pigment in 1 L of distilled water, is also formed, with 2.92 g of sodium chloride added as screening agent to ionically screen the colloidal particles and prepare them for deposition. An optical product is created by repeating the above procedure seven times using the first coating composition and the neutral second coating composition, followed by three times using the first coating composition and the accent second coating composition, followed by two times using the first coating composition and the neutral second coating composition, thereby forming a coating which is PET/7 layers black/3 layers yellow/2 layers black. The reflection and transmission of the composite coating were then measured using a UV-vis spectrometer, the results of which are depicted graphically in FIGS. 6 and 7 respectively.

Example 2

Using the same coating compositions from Example 1, an optical product was created by repeating the above procedure nine times using the first coating composition and the neutral second coating composition, followed by three times using the first coating composition and the accent second coating composition, thereby forming a composite coating which is PET/9 layers black/3 layers yellow. The reflection and transmission of the optical product were then measured using a UV-vis spectrometer, the results of which are depicted graphically in FIGS. 6 and 7 respectively.

Example 3

Using the same coating compositions from Examples 1 and 2, an optical product is created by repeating the above procedure three times using the first coating composition and the accent second coating composition, followed by nine times using the first coating composition and the neutral second coating composition, thereby forming a composite coating which is PET/3 layers yellow/9 layers black. The reflection and transmission of the optical product were then measured using a UV-vis spectrometer, the results of which are depicted graphically in FIGS. 6 and 7 respectively.

It can be seen that the transmission measurements of all three films are quite similar because they contain the same quantities of absorptive pigments, and as such produce similar transmitted color. Reflection measurements, however, indicate the distinctly different color reflection values of the three composite coatings.

TABLE 1

| Example No. | Transmission | | Reflection | | |
|---|---|---|---|---|---|
| | a* | b* | a* | b* | neutrality |
| 1 | −6.47082 | 14.86763 | 0.284662 | −0.19185 | 0.34327505 |
| 2 | −6.42574 | 14.35774 | 0.127561 | −10.7046 | 10.7053715 |
| 3 | −6.41008 | 14.18304 | 2.408377 | 4.627319 | 5.21654675 |

It can be seen from Table 1 that all three coatings show the strongly positive b* value indicative of very yellow transmission, but only the interleaved structure of Example 1 is appreciably neutral in reflection. Ex.2 produces a coating which is quite blue in reflection, and Ex. 3 produces one which is strongly yellow/red in reflection.

In Examples 4 and 5, we describe two techniques for constructing a film which selectively blocks red light using cyan pigment. Employing an interleaved structure (Ex. 4) results in a product which is substantially neutral in reflection, whereas grouping and separating the neutral and accent layers (Ex. 5) produces a colored reflection.

Example 4

Figure 8:
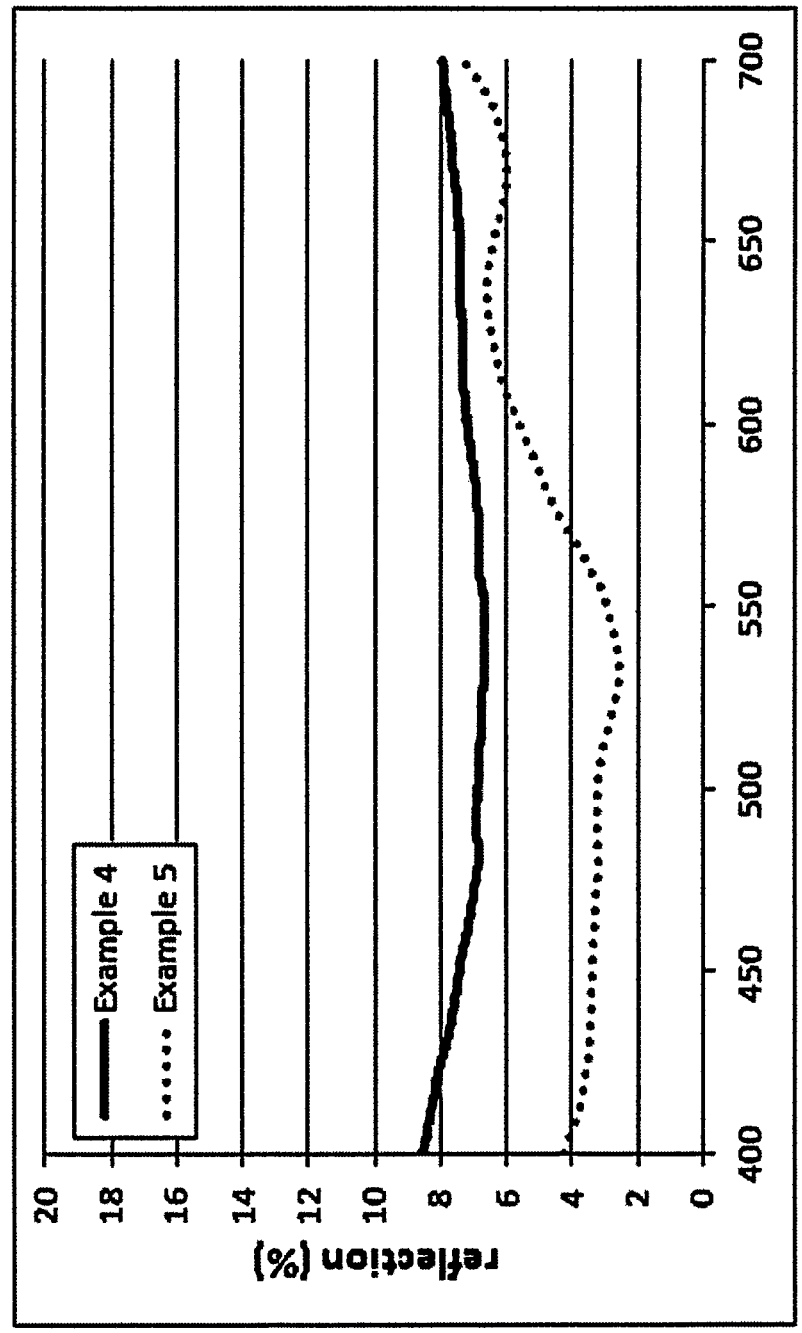
FIG. 8 is a plot of the percent transmission of wavelengths along the visible spectrum for two films prepared in the examples.
Figure 9:
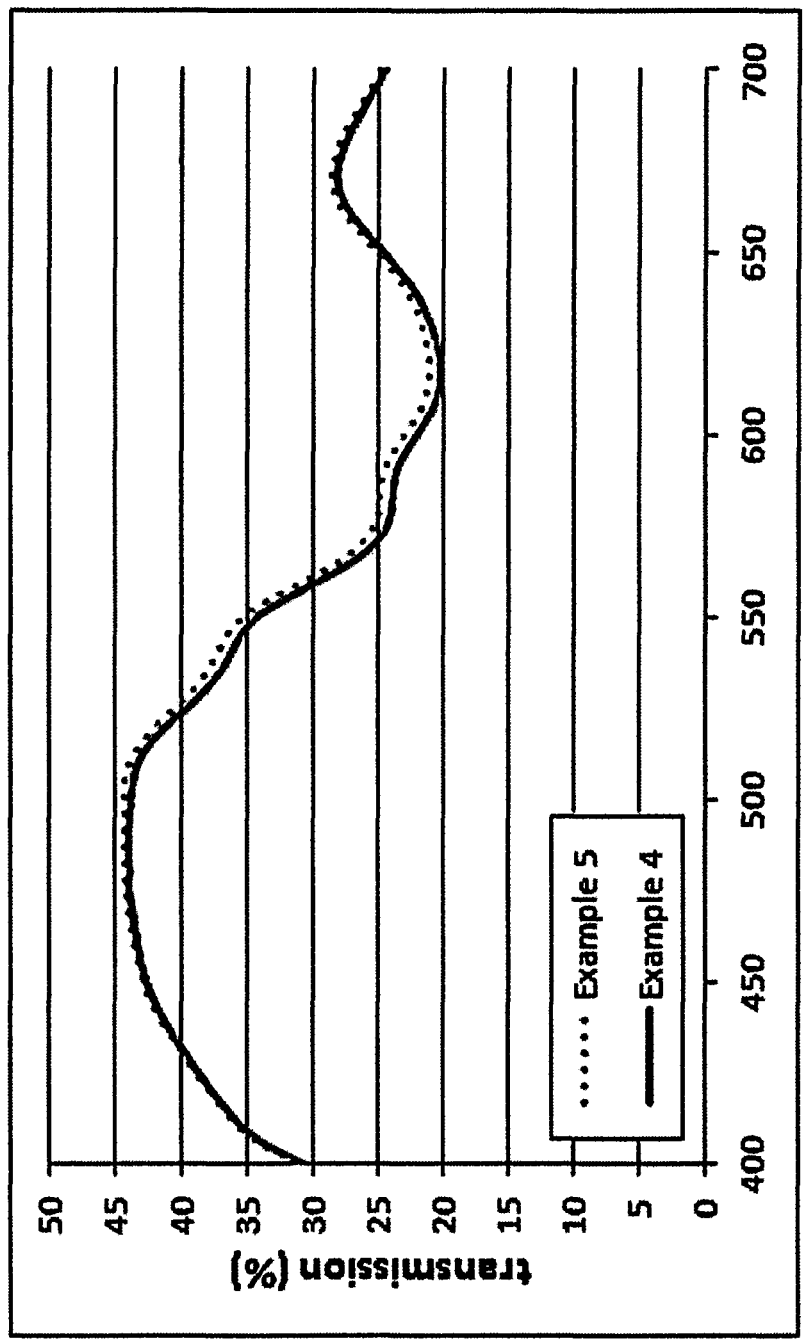
FIG. 9 is a plot of the percent transmission of wavelengths along the visible spectrum for two films prepared in the examples.

Another second coating composition for forming the second layer of an accent or blocking composite layer, a 0.5 wt % solids pigment dispersion of 35.0 g Cab-o-Jet 250C cyan pigment in 1 L of distilled water was formed, with 2.92 g of sodium chloride added as screening agent to ionically screen the colloidal particles and prepare them for deposition. An optical product was created by repeating the procedure of Example 1 seven times using the first coating composition and the neutral second coating composition, followed by three times using the first coating composition and the accent second coating composition containing the cyan pigment, followed by two times using the first coating composition and the neutral second coating composition, thereby forming a coating which is PET/7 layers black/3 layers cyan/2 layers black. The reflection and transmission of the composite coating were then measured using a UV-vis spectrometer, the results of which are depicted graphically in FIGS. 8 and 9 respectively.

Example 5

Using the same coating compositions from Example 4, an optical product was created by repeating the above procedure nine times using the first coating composition and the neutral second coating composition, followed by three times using the first coating composition and the accent second coating composition containing cyan pigment, thereby forming a composite coating which is PET/9 layers black/3 layers cyan. The reflection and transmission of the composite coating were then measured using a UV-vis spectrometer, the results of which are depicted graphically in FIGS. 8 and 9 respectively.

The transmission measurements of the two films are quite similar because they contain the same quantities of absorptive pigments, and as such produce similar transmitted color. The reflection measurements, however, indicate the distinctly different color reflection values of the two composite coatings.

TABLE 2

| Example No. | Transmission | | Reflection | | neutrality |
|---|---|---|---|---|---|
| | a* | b* | a* | b* | |
| 5 | −12.2317 | −12.9912 | 10.95137 | 3.34545 | 11.4509576 |
| 4 | −12.0144 | −13.9367 | 0.475119 | −0.79703 | 0.92789691 |

It can be seen from Table 2 that both coatings show the strongly negative a* and b* values indicative of blue/green transmission, but only the interleaved structure of Example 4 is appreciably neutral in reflection. Ex.5 produces a coating which is quite red in reflection.

A person skilled in the art will recognize that the measurements described herein are measurements based on publicly available standards and guidelines that can be obtained by a variety of different specific test methods. The test methods described represent only one available method to obtain each of the required measurements.

The foregoing description of various embodiments of the invention has been presented for purposes of illustration and description. It is not intended to be exhaustive or to limit the invention to the precise embodiments disclosed. Numerous modifications or variations are possible in electromagnetic energy of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

We claim:

1. An optical product comprising a composite coating, deposited on a substrate, that includes multiple bilayers having a first layer and a second layer, each provided with a binding group component which together form a complementary binding group pair, the multiple bilayers comprising, in sequence:
   at least one bilayer a) comprised of a first pigment or pigment blend that, when formed into a bilayer, exhibits a color reflection value that is less than about 2.5;
   at least one bilayer b) comprised of a pigment or pigment blend that, when formed into a bilayer, selectively blocks visible light in a wavelength range of interest; and
   at least one bilayer c) comprised of a second pigment or pigment blend that, when formed into a bilayer, exhibits a color reflection value that is less than about 2.5, and that may be the same as or different than the first pigment or pigment blend,
   wherein the optical product selectively blocks visible light in the wavelength range of interest, while exhibiting a color reflection value that is less than about 2.5.

2. The optical product of claim 1, wherein the wavelength range of interest is a 75 nm wavelength range.

3. The optical product of claim 1, wherein the wavelength range of interest is a 50 nm wavelength range.

4. The optical product of claim 1, wherein the wavelength range of interest is from 400 nm to 450 nm.

5. The optical product of claim 1, wherein the wavelength range of interest is from 600 nm to 650 nm.

6. The optical product of claim 1, wherein the wavelength range of interest is from 500 nm to 600 nm.

7. The optical product of claim 1, wherein the wavelength range of interest is from 525 nm to 575 nm.

8. The optical product of claim 1, further comprising:
   at least one bilayer d), deposited on the at least one bilayer c), comprised of a pigment or pigment blend that, when formed into a bilayer, selectively blocks visible light in the wavelength range of interest, and that may be the same as or different than the pigment or pigment blend of bilayer b); and
   at least one bilayer e) comprised of a neutral pigment or pigment blend that, when formed into a bilayer, exhibits a color reflection value that is less than about 2.5, and that may be the same as or different than the pigment or pigment blend of bilayer a) or bilayer c).

9. The optical product of claim 1, wherein the color reflection value is less than about 2.0.

10. The optical product of claim 1, wherein the color reflection value is less than about 1.5.

11. The optical product of claim 1, wherein the optical product blocks at least 70% of visible light within the wavelength range of interest.

12. The optical product of claim 1, wherein the optical product blocks at least 80% of visible light within the wavelength range of interest.

13. The optical product of claim 1, wherein the substrate comprises a polyethylene terephthalate film.

14. The optical product of claim 1, wherein the composite coating has a total thickness of 5 nm to 1000 nm.

15. The optical product of claim 1, in the form of a window film that is applied to a vehicle.

16. The optical product of claim 13, wherein the vehicle is an automobile, an aircraft, or a boat.

17. The optical product of claim 1, in the form of a window film applied to a building.

18. The optical product of claim 2, wherein the optical product is a composite interlayer for laminated glass.

19. The optical product of claim 16 wherein said optical product has a visible light transmission of no less than 40%.

20. The optical product of claim 16, wherein said optical product has a visible light transmission of no less than 60%.

* * * * *